US012188629B2

(12) United States Patent
Kang et al.

(10) Patent No.: US 12,188,629 B2
(45) Date of Patent: Jan. 7, 2025

(54) LAMP FOR VEHICLE

(71) Applicant: HYUNDAI MOBIS CO., LTD., Seoul (KR)

(72) Inventors: Dong Hwa Kang, Yongin-si (KR); Hyun Soo Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/146,204

(22) Filed: Dec. 23, 2022

(65) Prior Publication Data

US 2023/0358382 A1 Nov. 9, 2023

(30) Foreign Application Priority Data

May 4, 2022 (KR) ........................ 10-2022-0055212

(51) Int. Cl.
*F21S 41/265* (2018.01)
*F21S 41/43* (2018.01)

(52) U.S. Cl.
CPC ............. *F21S 41/265* (2018.01); *F21S 41/43* (2018.01)

(58) Field of Classification Search
CPC ........ F21S 41/265; F21S 41/43; F21S 41/143; G02B 3/0087
See application file for complete search history.

(56) References Cited

U.S. PATENT DOCUMENTS

| | | | | |
|---|---|---|---|---|
| 10,024,517 | B2 * | 7/2018 | Miyashita | F21S 41/275 |
| 10,295,137 | B2 * | 5/2019 | Stefanov | F21S 41/635 |
| 11,060,684 | B2 * | 7/2021 | Moser | F21S 41/285 |
| 11,519,582 | B2 * | 12/2022 | Chen | F21S 43/15 |
| 2007/0147041 | A1 * | 6/2007 | Shiratsuchi | F21V 5/008 362/268 |
| 2018/0320852 | A1 * | 11/2018 | Mandl | F21S 41/151 |
| 2021/0215314 | A1 * | 7/2021 | Schreiber | F21S 41/265 |

* cited by examiner

*Primary Examiner* — Matthew J. Peerce
(74) *Attorney, Agent, or Firm* — DLA PIPER LLP (US)

(57) ABSTRACT

A lamp for a vehicle that includes a light source part that generates and irradiates light, and a lens array provided on a front side of the light source part, the lens array includes a first lens part including a plurality of first micro lenses, to which the light is input from the light source part, and a second lens part including a plurality of second micro lenses that outputs the light input from the first lens part, and upward/downward sizes of at least some of the plurality of first micro lenses are smaller than upward/downward sizes of the second micro lenses provided at corresponding locations.

12 Claims, 31 Drawing Sheets

LAMP FOR VEHICLE

CROSS-REFERENCE TO RELATED APPLICATION

This application claims the benefit of priority to Korean Patent Application No. 10-2022-0055212, filed in the Korean Intellectual Property Office on May 4, 2022, the entire contents of which are incorporated herein by reference.

TECHNICAL FIELD

The present disclosure relates to a lamp for a vehicle, and more particular, to a lamp for a vehicle, to which a micro lens array is applied.

BACKGROUND

A micro lens array (MLA) has a plurality of micro lenses that are arranged to project an image. The micro lens array may display an image of an excellent quality with a small size, and thus is widely used in various fields. In recent years, studies for reducing a size of a lamp for a vehicle by using a micro lens having a relatively small focal distance have been actively made.

According to the lamp for a vehicle including a micro lens array, an amount of light in a long-distance pattern may be degraded when the light is irradiated to a road surface to be inclined, and thus it may be difficult to secure the uniformity of the pattern. Accordingly, it is necessary to improve a technology for enhancing the uniformity of an optical pattern by minimizing loss of the amount of light.

Furthermore, according to the lamp for a vehicle including the micro lens array, resolution and optical performance may be degraded according to an inclination angle when the light is irradiated to the road surface to be inclined. Furthermore, conventionally, the optical system itself is mounted to be inclined to irradiate the light to the road surface such that the light is inclined, and in this case, a size of the lamp for a vehicle increases as a range occupied by the optical system in an interior of the lamp increases.

Meanwhile, generally, a welcome ceremony is a technology of increasing convenience and product values by displaying states of a vehicle to drivers with various pieces of information before a vehicle is driven. As an example of a welcome ceremony, a welcome light or a puddle lamp is a technology for forming a beam pattern while the lamp is lighted from a side surface of a vehicle when a user intends to unlock a door with a smart key, and functions to inform drivers of information such as a parking location while increasing a product value of the vehicle.

In recent years, for lamps for a vehicle, such as a welcome light, which display specific information on a road surface, an optical system of a projection type using a micro lens array is used.

However, conventionally, because the projection type optical system implements only one pattern with a static image, it is difficult to implement a dynamic image. Accordingly, according to the conventional technology, it is difficult to secure visibility and understand information intuitively by implementing a dynamic image.

Furthermore, according to the conventional technology, because an image is implemented by one optical system, a difference between the brightness of along-distance pattern and the brightness of a short-distance pattern in the beam pattern irradiated to a road surface occurs. Accordingly, it is difficult to secure the uniformity of the pattern.

SUMMARY

The present disclosure has been made to solve the above-mentioned problems occurring in the prior art while advantages achieved by the prior art are maintained intact.

An aspect of the present disclosure provides a lamp for a vehicle that enhances a uniformity of a beam pattern formed on a road surface by a lens array by enhancing a uniformity of an amount of input light in an entire area of a first lens part.

Another aspect of the present disclosure provides a lamp for a vehicle that is configured to minimize loss of an amount of light to increase a uniformity of a beam pattern formed on a road surface while an additional light source is not used.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a lamp for a vehicle includes a light source part that generates and irradiates light, and a lens array provided on a front side of the light source part, the lens array includes a first lens part including a plurality of first micro lenses, to which the light is input from the light source part, and a second lens part including a plurality of second micro lenses that outputs the light input from the first lens part, and upward/downward sizes of at least some of the plurality of first micro lenses are smaller than upward/downward sizes of the second micro lenses provided at corresponding locations.

The lamp may further include a shield part located between the first lens part and the second lens part, and that shields a portion of the light input from the first lens part to the second lens part to form a specific beam pattern on a road surface.

When a central area of the lens array, which corresponds to a partial area of the lens array and through which an optical axis of the light source part passes when the lens array is viewed from a rear side, is defined as a first area, and an area disposed at a circumference of the first area, which corresponds to the remaining areas of the lens array, is defined as a second area, upward/downward sizes of the first micro lenses provided in the second area may be smaller than upward/downward sizes of the second micro lenses provide in the second area.

Upward/downward curvatures of the first micro lenses provided in the second area may be larger than upward/downward curvatures of the first micro lenses provided in the first area.

Upward/downward sizes of the plurality of first micro lenses provided in the second area may decrease as they become farther from the first area.

The shield part may include a plurality of unit masks provided to correspond to the plurality of second micro lenses, and in which masking patterns for forming the beam pattern are formed, and each of the unit masks may include a shield area that shields the light, and a through area that transmits the light, and having a shape corresponding to the masking pattern.

When a direction that becomes farther from the lamp in the beam pattern is defined as a long-distance direction, and an opposite direction to the long-distance direction is defined as a short-distance direction, a plurality of first micro lenses disposed to correspond to one second micro lens may be provided in the second area, the shield area may include a long-distance edge that contacts an end of the through area and forms an end line in the long-distance direction of the beam pattern, and a focus of, among the plurality of first micro lenses corresponding to the one second micro lens, the first micro lens that forms a beam pattern in a longest-distance direction may be formed at a location corresponding to the long-distance edge.

In the second area, upward/downward curvatures of, among the plurality of first micro lenses corresponding to the one second micro lens, the first micro lens that forms a beam pattern of the longest-distance direction may be formed to be larger than upward/downward curvatures of the remaining first micro lenses.

A focus of the first micro lens that forms the beam pattern of the longest-distance direction may be located in the through area, and focuses of the remaining first micro lenses, other than the first micro lens that forms the beam pattern of the longest-distance direction, may be located at a location that is spaced part from the through area forwards or rearwards.

A size of the through area may gradually increase as the plurality of unit masks becomes farther from a central portion, through which an optical axis of the light source part passes.

When a direction that becomes farther from the lamp in the beam pattern is defined as a long-distance direction, and an opposite direction to the long-distance direction is defined as a short-distance direction, the shield area may include a long-distance edge that contacts an end of the through area and forms an end line in the long-distance direction of the beam pattern, and a short-distance edge that faces the long-distance edge and forms an end line in the short-distance direction of the beam pattern, and the long-distance edge may become gradually farther from the short-distance edge whereby a size of the through area gradually increases as the plurality of unit masks becomes farther from a central portion, through which an optical axis of the light source part passes.

Leftward/rightward widths of the short-distance edges formed in the plurality of unit masks may be the same.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, embodiments of the present disclosure will be described in detail with reference to the accompanying drawings.

First, the embodiments described herein are embodiments that are suitable for understanding the technical features of a lamp for a vehicle according to the present disclosure. However, the present disclosure is not limited to the embodiment described below or the technical features of the present disclosure are not limited by the described embodiments, and the present disclosure may be variously modified without departing from the technical scope of the present disclosure.

A lamp 100, 200, 300, or 400 according to the present disclosure relates to a lamp for a vehicle that uses a micro lens array, and for example, may be a guide lamp that implements a pattern image of a specific shape on a road surface 2 that is adjacent to a vehicle 1 by projecting light to the road surface.

As an example, the lamps 100, 200, 300, and 400 for a vehicle according to the present disclosure may be a rear guide lamp, a welcome guide lamp, or a turn signal guide lamp that is turned on or off together with a rear lamp. Hereinafter, a case, in which the lamps 100, 200, 300, and 400 for a vehicle according to the present disclosure is the rear guide lamp (see FIG. 1) or the turn signal lamp (see FIG. 15), will be described as an example. However, the lamps 100, 200, 300, and 400 for a vehicle according to the present disclosure is not limited to such a lamp for a vehicle, and any lamp that irradiates a specific pattern to a road surface may be applied with no limitation.

In this case, the lamps 100, 200, 300, and 400 for a vehicle often irradiates light such that the light is inclined toward a road surface, and accordingly, a difference between brightness of a long-distance pattern area that is remote from the lamp for a vehicle and a short-distance pattern area that is close to the lamp for a vehicle on the beam pattern may occur. That is, the brightness of the long-distance pattern area may become lower than that of the short-distance pattern area whereby optical uniformity may deteriorate. The present disclosure proposes a technology for solving the problem.

First Embodiment

Figure 1:
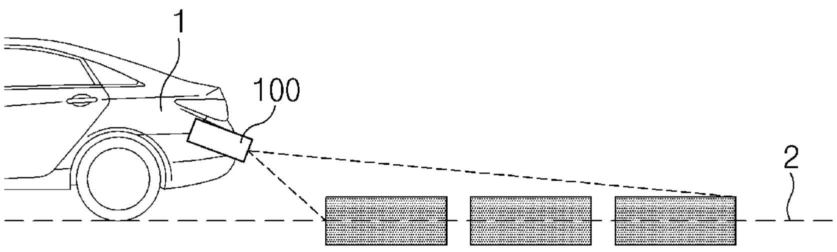
FIG. 1 is a view illustrating an example, in which a lamp for a vehicle according to a first embodiment of the present disclosure is installed in a vehicle.
Figure 2:
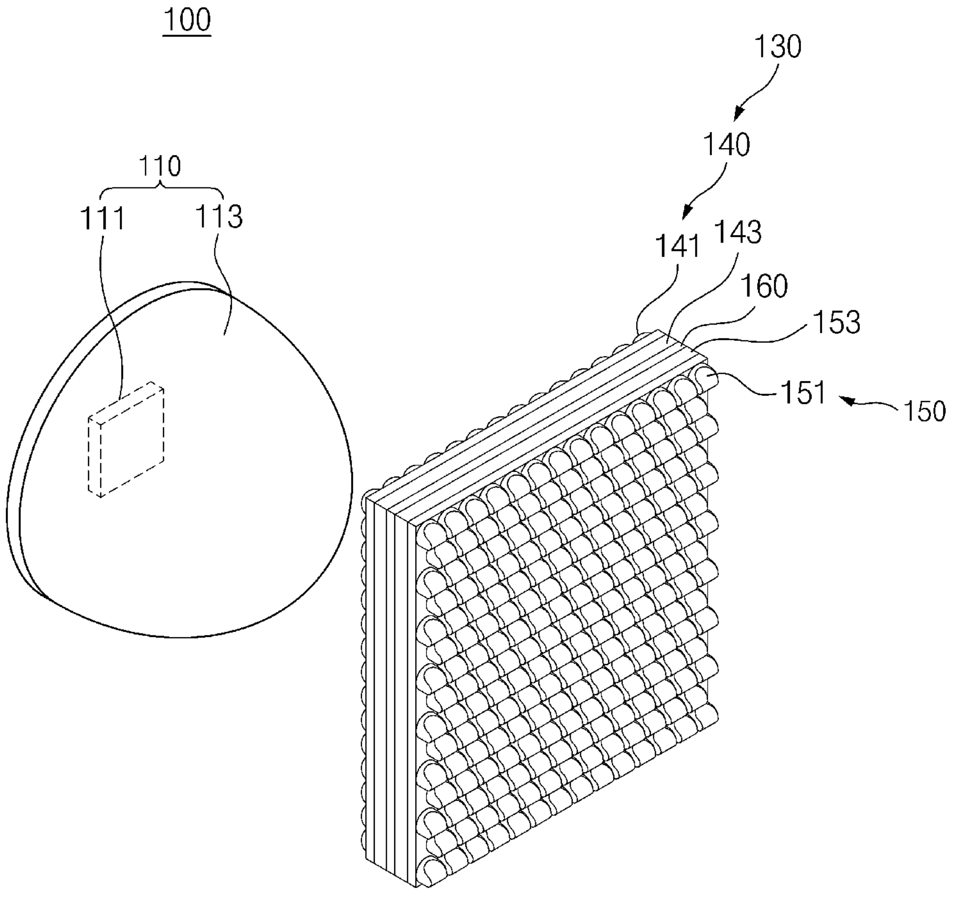
FIG. 2 is a perspective view illustrating the lamp for a vehicle according to the first embodiment of the present disclosure.
Figure 3:
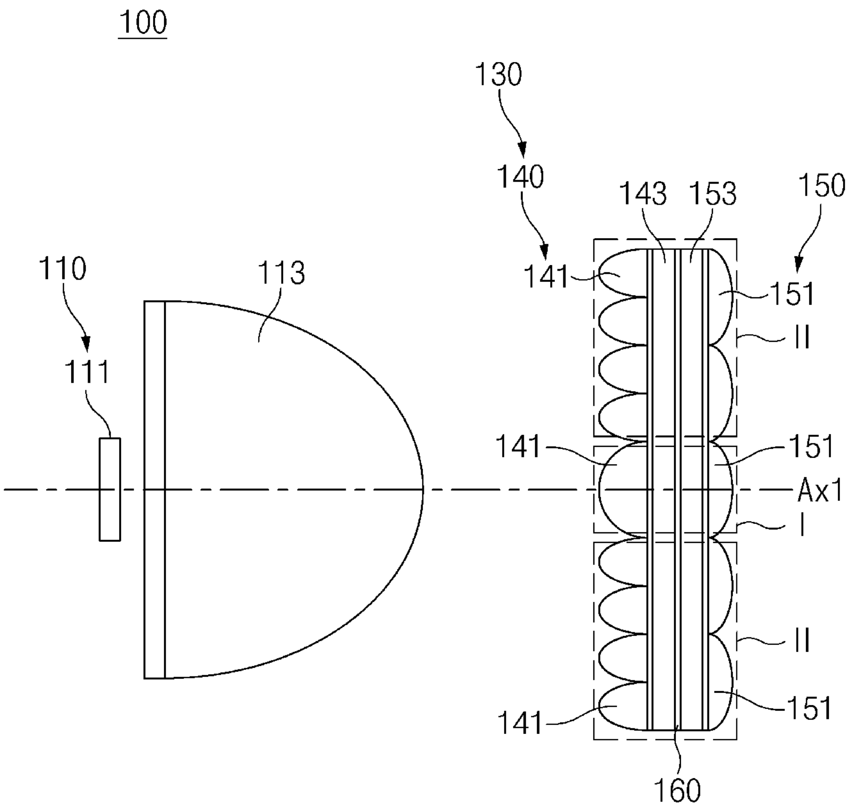
FIG. 3 is aside view illustrating the lamp for a vehicle according to the first embodiment of the present disclosure.
Figure 4:
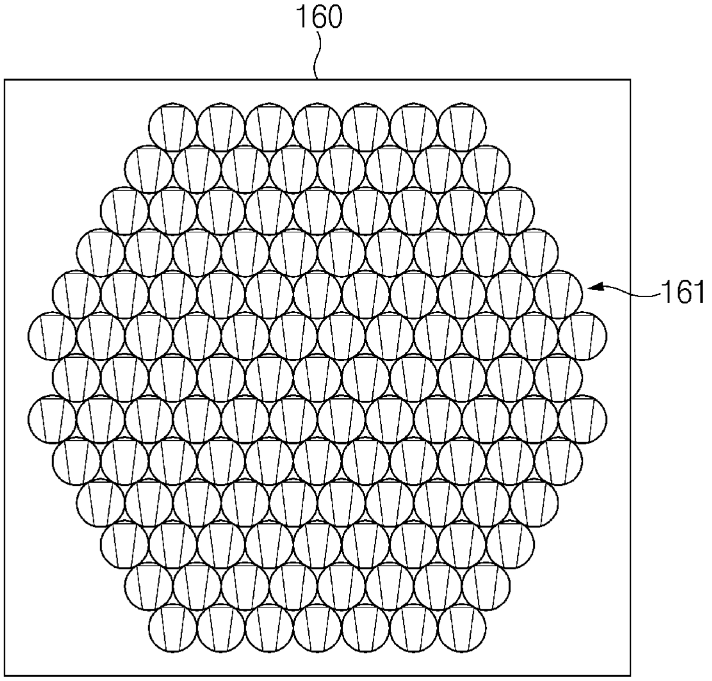
FIG. 4 is a front view obtained by viewing a lens array according to the first embodiment of the present disclosure from a front side.
Figure 5:
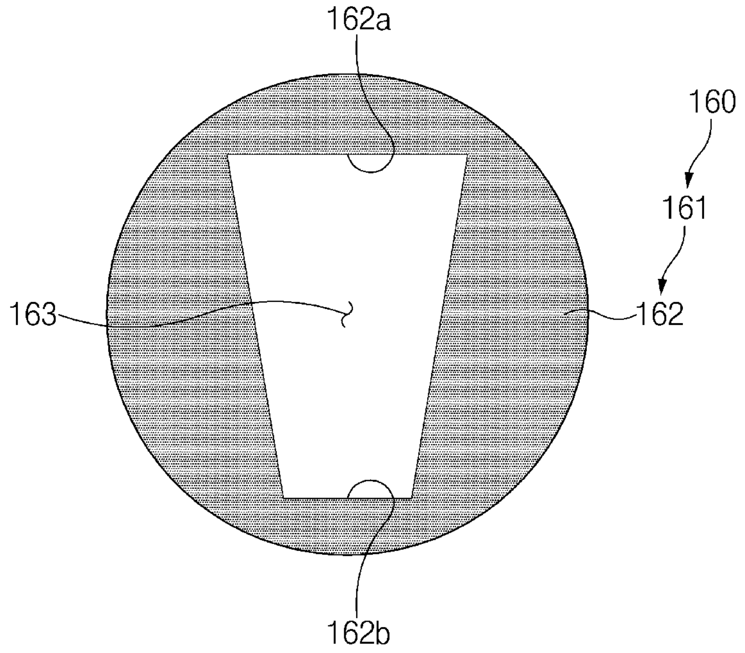
FIG. 5 is a view illustrating a unit mask of a shield part according to the first embodiment of the present disclosure.
Figure 6:
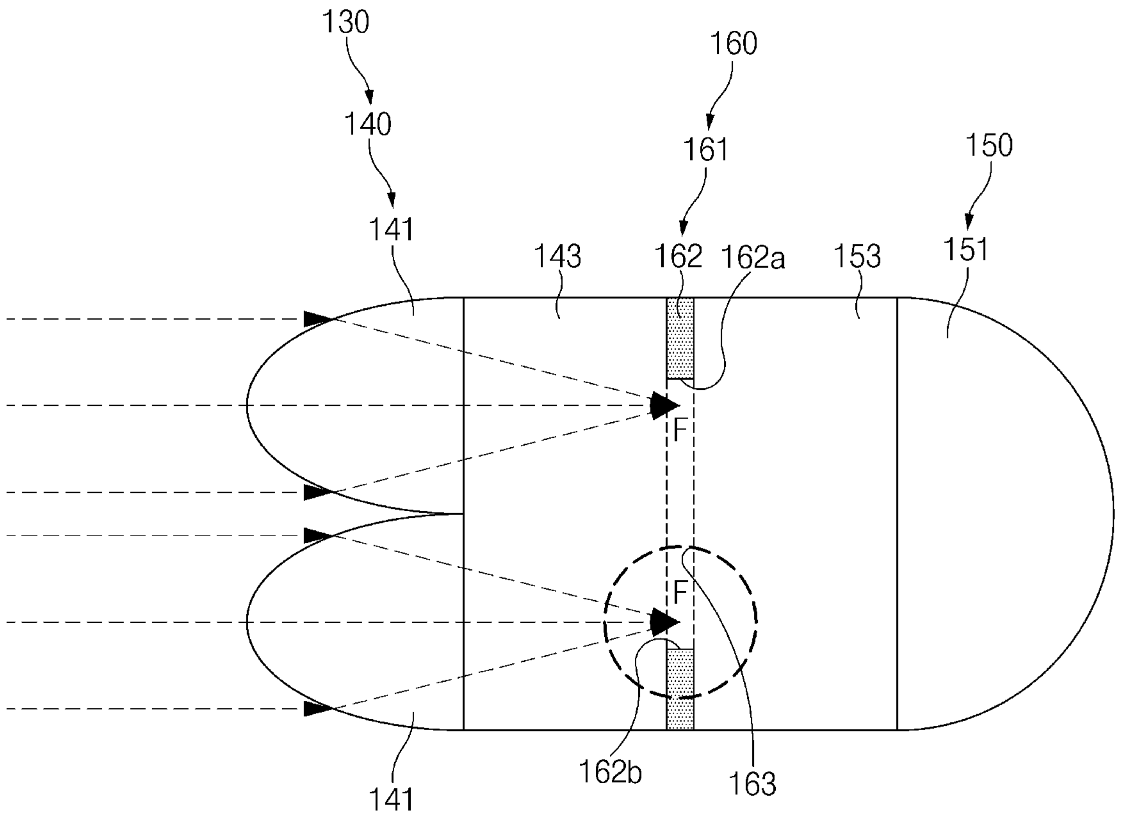
FIG. 6 illustrates aside view of the lamp for a vehicle according to the first embodiment of the present disclosure, and is an enlarged view of a portion of FIG. 3.
Figure 7:
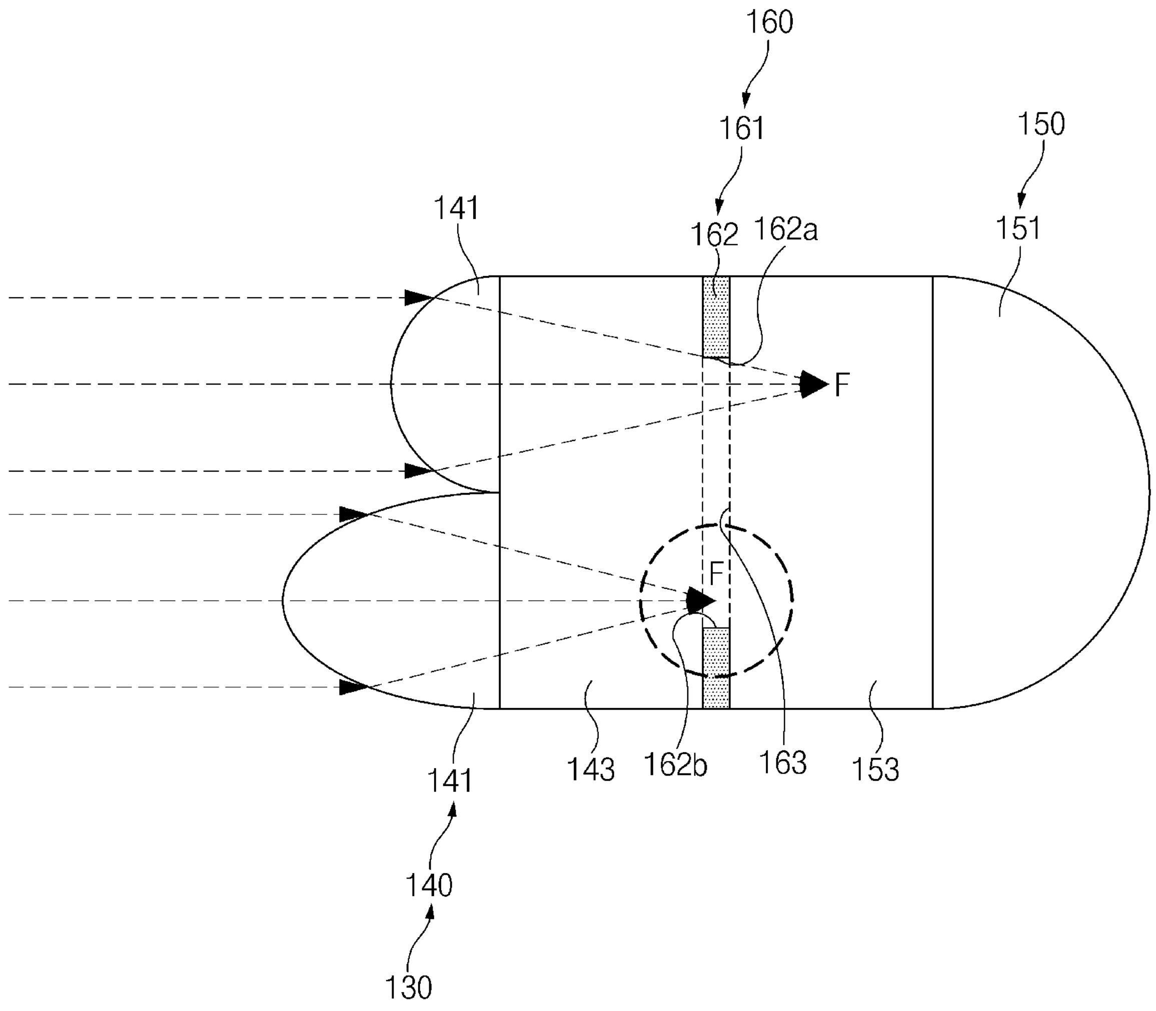
FIG. 7 illustrates a side view of a lamp for a vehicle according to a modification of the first embodiment of the present disclosure.
Figure 8A:
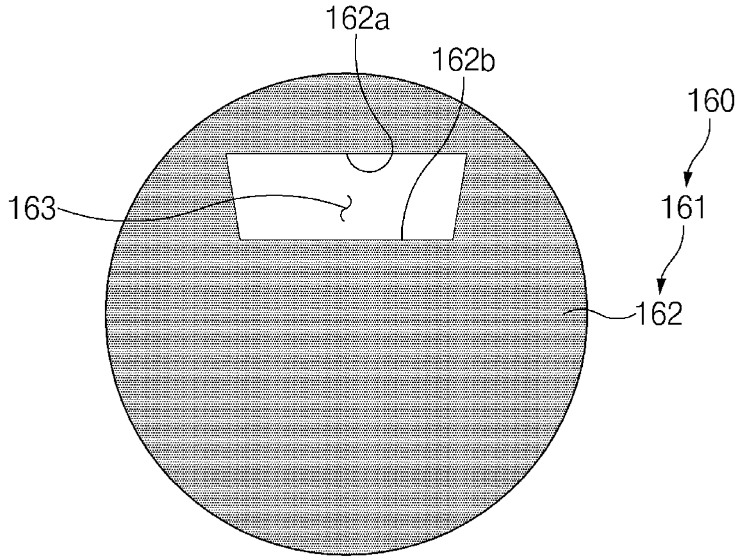
FIG. 8A is a view illustrating a unit mask disposed in a central area of the lens array according to the present disclosure, that is, in a first area.
Figure 8B:
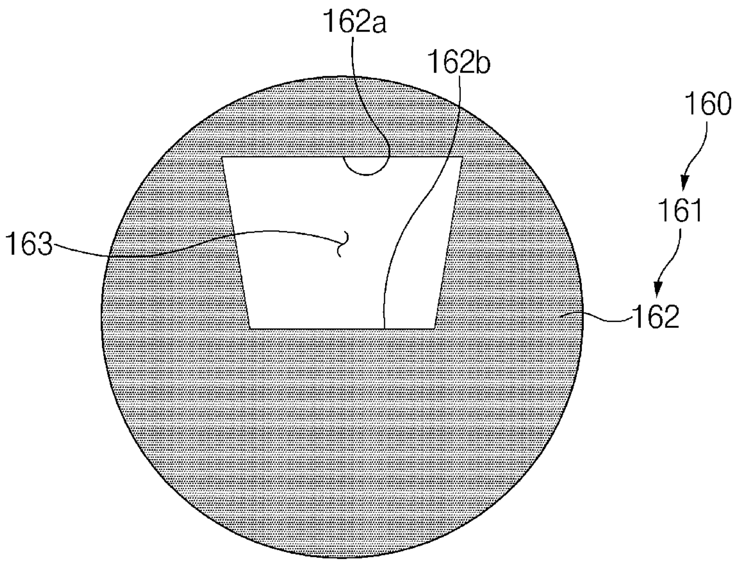
FIG. 8B is a view illustrating a unit mask disposed between a central area and a peripheral area of the lens array according to the present disclosure.
Figure 8C:
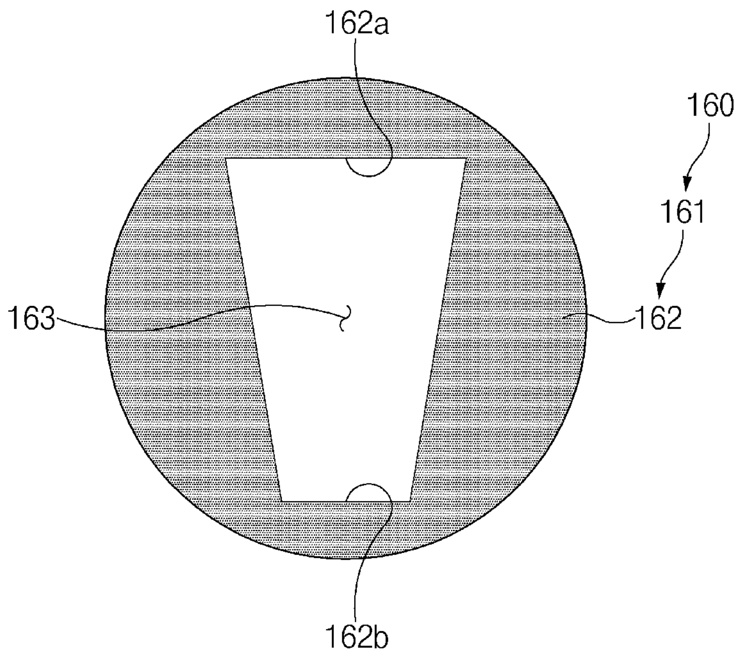
FIG. 8C is a view illustrating a unit mask disposed in a peripheral area of the lens array according to the present disclosure.

FIG. 1 to 8C illustrate a first embodiment of the present disclosure. FIG. 1 is a view illustrating an example, in which a lamp for a vehicle according to a first embodiment of the present disclosure is installed in a vehicle. FIG. 2 is a perspective view illustrating the lamp for a vehicle according to the first embodiment of the present disclosure. FIG. 3 is a side view illustrating the lamp for a vehicle according to the first embodiment of the present disclosure. FIG. 4 is a front view obtained by viewing a lens array according to the first embodiment of the present disclosure from a front side. FIG. 5 is a view illustrating a unit mask of a shield part according to the first embodiment of the present disclosure. FIG. 6 illustrates a side view of the lamp for a vehicle according to the first embodiment of the present disclosure, and is an enlarged view of a portion of FIG. 3. FIG. 7 illustrates a side view of a lamp for a vehicle according to a modification of the first embodiment of the present disclosure. FIG. 8A is a view illustrating a unit mask disposed in a central area of the lens array according to the present disclosure, that is, in a first area. FIG. 8B is a view illustrating a unit mask disposed between a central area and a peripheral area of the lens array according to the present disclosure. FIG. 8C is a view illustrating a unit mask disposed in a peripheral area of the lens array according to the present disclosure.

Referring to FIGS. 1 to 8C, the lamp 100 for a vehicle according to the first embodiment of the present disclosure includes alight source part 110 and a lens array 130. Furthermore, the lamp 100 for a vehicle according to the first embodiment of the present disclosure may further include a shield part 160.

The light source part 110 is configured to generate and irradiate light. The lens array 130 is provided on a front side of the light source part 110 and is configured to output the light input from the light source part 110 to a front side.

For example, the light source part 110 may be configured to irradiate the light in a direction that faces the road surface 2. The light source part 110 may include a light source 111 and a collimator 113. For example, the light source 111 may be alight emitting diode (hereinafter, referred to as an "LED"), but the present disclosure is not limited thereto. The collimator 113 may convert the light radiated from the light source 111 to light that is parallel to an optical axis, and may input the light to a first lens part 140.

The lens array 130 includes the first lens part 140 and a second lens part 150.

The first lens part 140 includes a plurality of first micro lenses 141, to which the light is input from the light source part 110. The second lens part 150 includes a plurality of second micro lenses 151 that are configured to output the light that is input from the first lens part 140.

For example, each of the first micro lenses 141 may include an input surface that is formed to be convex in a direction that faces the light source part 110, and the input surfaces of the plurality of first micro lenses 141 may be collected to form an input surface of the entire first lens part 140. Furthermore, each of the second micro lenses 151 may include an output surface that is formed to be convex in the direction that faces the road surface 2, and the output surfaces of the plurality of second micro lenses 151 may be collected to form an output surface of the entire second lens part 150. Meanwhile, the shapes of the first micro lenses 141 and the second micro lenses 151 are not limited to the above description.

For example, the first lens part 140 may further include a first light transmitting body 143, and the first light transmitting body 143 may have the first micro lenses on a surface that faces the light source part 110 and may be formed of a material that transmits light.

Furthermore, for example, the second lens part 150 may further include a second light transmitting body 153, and the second micro lenses 151 may be formed on a surface that faces an opposite direction to the direction that faces the first light transmitting body 143 to transmit light. Furthermore, the second light transmitting body 153 may be configured to be opposite to the first light transmitting body 143 while the shield part 160 being interposed therebetween.

The first light transmitting body 143 and the second light transmitting body 153 may function as bodies for integrally forming the first lens part 140 and the second lens part 150. However, the present disclosure is not limited thereto, and when the first lens part 140 and the second lens part 150 are not integrally formed, at least one of the first light transmitting body 143 and the second light transmitting body 153 may be omitted.

Meanwhile, upward/downward sizes of at least some of the plurality of first micro lenses 141 may be smaller than upward/downward sizes of the second micro lenses 151 provided at a corresponding location.

In detail, when a central area of the lens array 130, which corresponds to a partial area of the lens array 130 and through which an optical axis of the light source part 110 passes, is defined as a first area "I", and an area disposed at a circumference of the first area "I", which corresponds to the remaining areas of the lens array 130, is defined as a second area "II", when the lens array 130 is viewed from a rear side. Then, the upward/downward sizes of the first micro lenses 141 provided in the second area "II" may be smaller than the upward/downward sizes of the second micro lenses 151 provided in the second area "II".

In detail, in the first area "I" that is a central area of the input surface of the first lens part 140, in which an intensity of the light irradiated from the light source part 110 is highest, may be formed in a range, in which the upward/downward sizes of the first micro lenses 141 and the second micro lenses 151 are the same or similar.

In detail, in the second area "II" that is an outskirt area of the central area of the input surface of the first lens part 140, in which the intensity of the light irradiated from the light source part 110 is relatively low, the upward/downward sizes of the first micro lenses 141 are smaller than those of the second micro lenses 151.

For example, as in the illustrated embodiment, the upward/downward sizes of the second micro lenses 151 in the second area "II" may be two times of the upward/downward sizes of the first micro lenses 141. However, the present disclosure is not limited thereto, and the upward/downward sizes of the second micro lenses 151 in the second area "II" may be three times or more of the upward/downward sizes of the first micro lenses 141.

When the thicknesses of the lenses are similar, curvatures of the lenses become larger as the upward/downward sizes of the lenses become smaller, and an amount of the light that is input through the lenses may increase as the curvatures become larger. According to the first embodiment, an amount of the light that is input through the first micro lenses 141 may be increased in the second area "II" that is an area, in which the intensity of the light irradiated from the light source part 110 is relatively low, by making the upward/downward sizes of the first micro lenses 141 provided in the second area "II" smaller.

Accordingly, according to the present disclosure, the uniformity of an amount of the light that is input to the entire area of the first lens part 140 may be enhanced, and thus, the uniformity of the beam pattern formed on the road surface 2 by the lens array 130 may be enhanced. Accordingly, according to the present disclosure, the uniformity of the beam pattern formed on the road surface 2 may be enhanced while an additional light source 111 is not used, by minimizing loss of the amount of the light.

Meanwhile, the upward/downward curvatures of the first micro lenses 141 provided in the second area "II" may be larger than the upward/downward curvatures of the first micro lenses 141 provided in the first area "I".

In detail, radii of curvature of the first micro lenses 141 of the second area "II" may be formed to be smaller than the first micro lenses 141 of the first area "I". Accordingly, loss of the amount of the light may be minimized by increasing the amount of the light that is input through the first micro lenses 141 of the second area "II", and thus, the uniformity of the amount of the light that is input to the entire area or the first lens part 140 may be enhanced.

Meanwhile, the upward/downward sizes of the plurality of first micro lenses 141 provided in the second area "II" may become smaller as they become farther from the first area "I".

In detail, the intensity of the light that is radiated from the light source 111 and passes through the collimator 113 is highest in a central area of the first lens part 140 and becomes gradually lower as it becomes farther from the central area. Because the upward/downward sizes of the plurality of first micro lenses 141 provided in the second area "II" decreases as they become farther from the central area, the amount of light input through the first micro lenses 141 of the second area may be increased.

Meanwhile, the shield part 160 may be located between the first lens part 140 and the second lens part 150, and may shield a portion of the light that is input from the first lens part 140 to the second lens part 150 to form a specific beam pattern on the road surface 2.

In detail, the shield part 160 may include a unit mask 161. A plurality of unit masks 161 may be provided to correspond to the plurality of second micro lenses 151, respectively, and a masking pattern for forming the beam pattern may be formed. That is, the unit masks 161 may be provided to correspond to the second micro lenses 151 disposed on an output side of the lens array 130.

In more detail, each of the unit masks 161 may include a shield area 162 that is configured to shield the light, and a through area 163 having a shape corresponding to the masking pattern. According to the shape of the through area 163, that is, the shape of the masking pattern, an image of the beam pattern that is projected to the road surface 2 may be changed. The unit mask 161 may have a plate shape as an example, and the specific beam pattern may be formed by masking the light in the shield area 162.

Meanwhile, a direction that becomes farther from the lamp 100 for a vehicle in the beam pattern is defined as a long-distance direction, and an opposite direction to the long-distance direction is defined as a short-distance direction.

In the second area "II", a plurality of first micro lenses 141 disposed to correspond to one second micro lens 151 may be provided.

The shield area 162 may include a long-distance edge **162*b* that contacts an end of the through area 163 and forms an end line in the long-distance direction of the beam pattern, and a short-distance edge 162*a* that faces the long-distance edge 162*b* and forms an end line in the short-distance direction of the beam pattern. For example, referring to the illustrated embodiment, the long-distance edge 162*b* may contact a lower end of the through area 163, and the short-distance edge 162*a* may contact an upper end of the through area 163**.

Here, a focus "F" of, among the plurality of first micro lenses 141 corresponding to the one second micro lens 151, the first micro lens 141 that forms the beam pattern of the longest-distance direction may be formed at a location corresponding to the long-distance edge **162*b*. For example, referring to FIG. 6, among the first micro lenses 141 disposed on the upward/downward direction, the first micro lens 141 disposed on an upper side may form the beam pattern in the long-distance direction. Furthermore, the focus "F" of the first micro lens 141 disposed on the upper side may be located to be adjacent to the long-distance edge 162***b*.

In this way, because the focus "F" of the first micro lens 141 is located at the long-distance edge 162*b*, a point of a maximum intensity of light of the first micro lens 141 is located at the long-distance edge 162*b*. Accordingly, a brightness of the long-distance area of the beam pattern may be increased and, may enhance the uniformity of the beam pattern.

However, when the curvature of the first micro lens 141 on the upper side and the curvature of the first micro lens 141 disposed on the lower side are the same as in FIG. 6, a point of the maximum intensity of light of the first micro lens 141 is located even at the short-distance edge 162*a*. In this case, the brightness of the pattern of the short-distance direction and the brightness of the pattern of the long-distance direction may become uneven.

As illustrated in FIG. 7, in the second area "II", the upward/downward curvature of, among the plurality of first micro lenses 141 corresponding to one second micro lens 151, the first micro lens 141 that forms the beam pattern in the longest-distance direction may be larger than the upward/downward curvature of the remaining first micro lenses 141.

Accordingly, the radius of curvature of the first micro lens 141 that irradiates the light to the short-distance area may become larger, and condensing rate may be decreased. Accordingly, because the brightness of the long-distance area and the short-distance area is uniform on the beam pattern, the uniformity of the pattern may be enhanced.

Furthermore, referring to FIG. 7, the focus "F" of the first micro lenses 141 that forms the beam pattern in the longest-distance direction may be located in the through area 163.

Furthermore, the focus "F" of the remaining first micro lenses 141, other than the first micro lenses 141 that form the beam pattern in the longest-distance direction, may be located at a location that is spaced forwards or rearwards apart from the through area 163.

Accordingly, because the brightness of the long-distance area and the short-distance area is uniform on the beam pattern, the uniformity of the pattern may be enhanced.

Meanwhile, FIG. 8A is a view illustrating the unit mask 161 disposed in the central area of the lens array 130 according to the present disclosure, that is, in the first area "I". FIG. 8C is a view illustrating the unit mask 161 disposed in a peripheral area of the lens array 130 according to the present disclosure. FIG. 8B is a view illustrating the unit mask 161 disposed between the central area and a peripheral area of the lens array 130 according to the present disclosure.

Referring to FIGS. 8A to 8C, in the plurality of unit masks 161, the size of the through area 163 may become gradually larger as it becomes farther from the central portion, through which the optical axis of the light source part 110 passes.

In detail, the intensity of the light that passes through the collimator 113 and is input to the first lens part 140 may be highest at a central portion of the first lens part 140. Furthermore, as the sizes of the through areas 163 of the unit masks 161 become larger, the brightness of the beam pattern may be higher. In the unit mask 161 according to the present disclosure, the size of the through area 163 may become gradually larger as it goes from the central portion of the lens array 130 to a periphery thereof whereby the optical uniformity of the beam pattern irradiated to the road surface 2 may be enhanced.

Here, the sizes of the through areas 163 of the unit masks 161 that are adjacent in a direction that faces the periphery of the lens array 130 from the central portion may be different within a specific range (for example, about 1 mm). Accordingly, a change in the amount of light does not abruptly occur between pattern areas corresponding to the adjacent unit masks 161 whereby a sense of intermittence due to the change in the amount of light may be prevented in advance.

Meanwhile, a direction that becomes farther from the lamp 100 for a vehicle in the beam pattern is defined as a long-distance direction, and an opposite direction to the long-distance direction is defined as a short-distance direction, Then, the shield area 162 may include the long-distance edge 162*b* that contacts an end of the through area and forms an end line in the long-distance direction of the beam pattern, and the short-distance edge 162*a* that faces the long-distance edge 162*b* and forms an end line in the short-distance direction of the beam pattern.

Furthermore, because the long-distance edge 162*b* becomes gradually farther from the short-distance edge 162*a* as the unit mask 161 becomes farther from the central portion, through which the optical axis of the light source part 110 passes, the size of the through area 163 may become gradually larger.

Furthermore, for example, the leftward/rightward widths of the short-distance edges 162*a* formed in the plurality of unit masks 161 may be the same.

Accordingly, because the locations and the sizes of the long-distance edges 162*b* are the same and the locations and the sizes of the short-distance edge 162*a* are changed on the unit masks 161, the sizes of the through areas 163 may be controlled.

Here, a ratio of the long-distance edge 162*b* to the short-distance edge 162*a* in the shield area 162 may be larger than a ratio of an end line in the long-distance direction to an end line in the short-distance direction in the beam pattern. For example, when the beam pattern formed on the road surface 2 is rectangular, the leftward/rightward width of the long-distance edge 162*b* may be larger than the leftward/rightward width of the facing short-distance edge 162*a*. That is, when the shape of the beam pattern is rectangular, the through area 163 may be trapezoidal.

According to the lamp for a vehicle according to the first embodiment of the present disclosure, the uniformity of the amount of the light that is input may be enhanced in all the areas of the first lens part, and thus, the uniformity of the beam pattern formed on the road surface by the lens array may be enhanced.

According to the embodiment of the present disclosure, the uniformity of the beam pattern formed on the road surface may be increased because loss of the amount of light is minimized even while an additional light source is not used.

Second Embodiment

Figure 9:
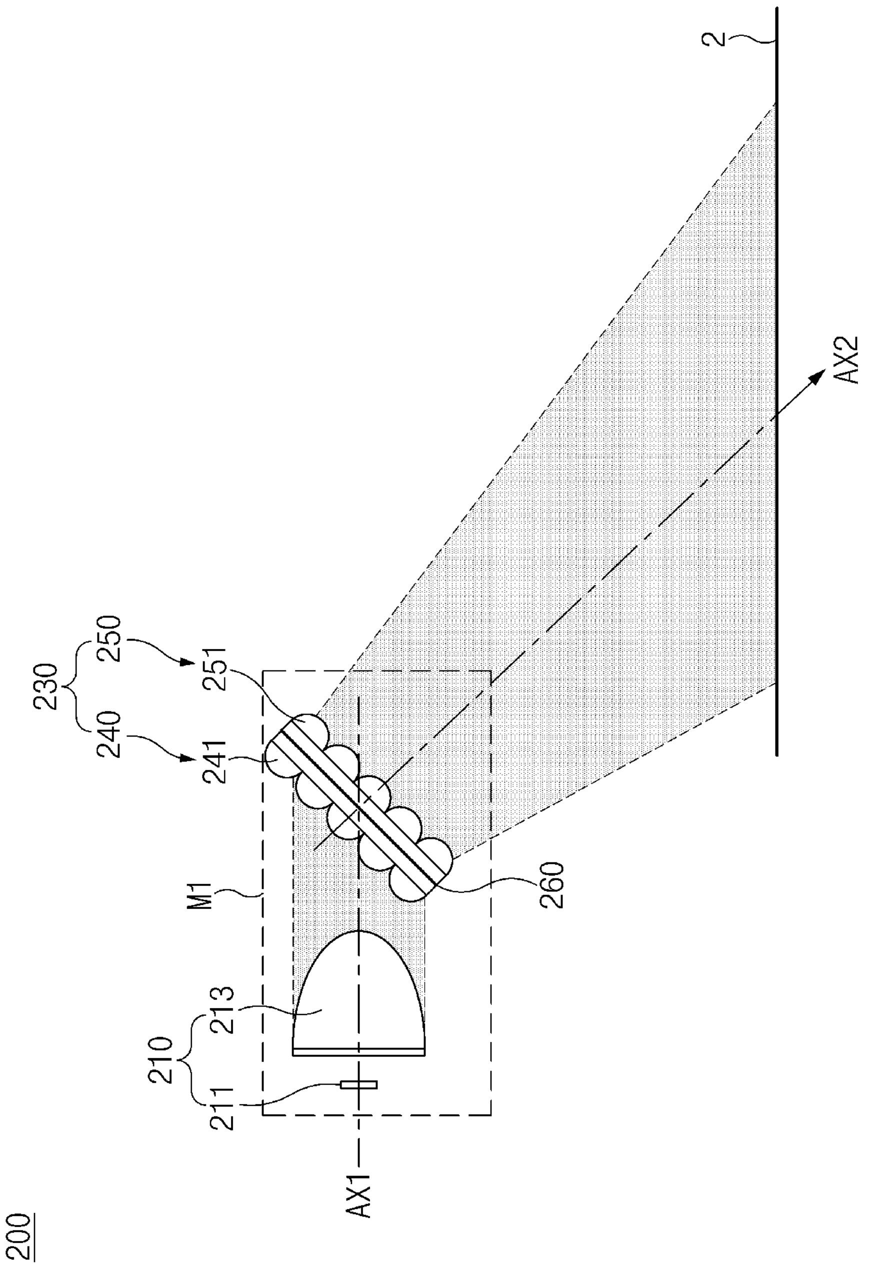
FIG. 9 is a view schematically illustrating a lamp for a vehicle according to a second embodiment of the present disclosure.
Figure 10:
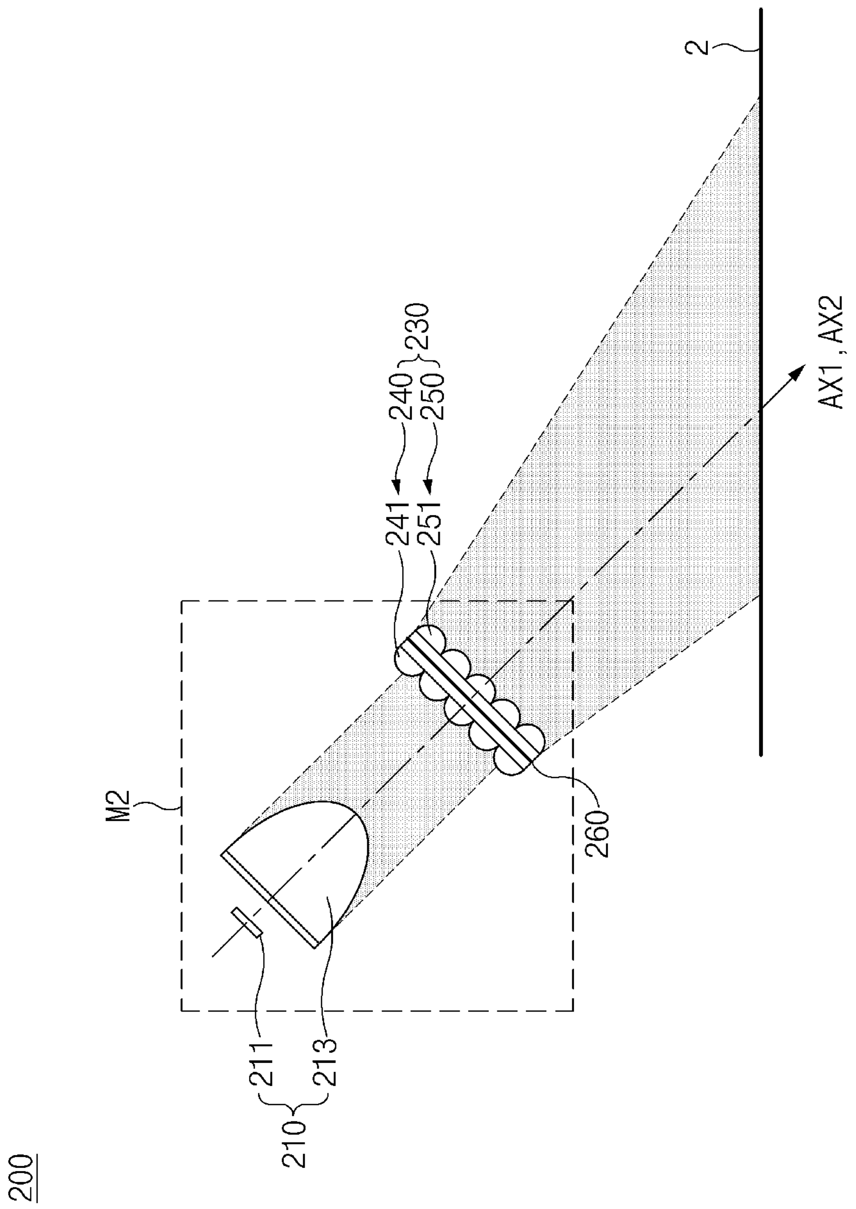
FIG. 10 is a view schematically illustrating a lamp for a vehicle according to a comparative example of the present disclosure.
Figure 11:
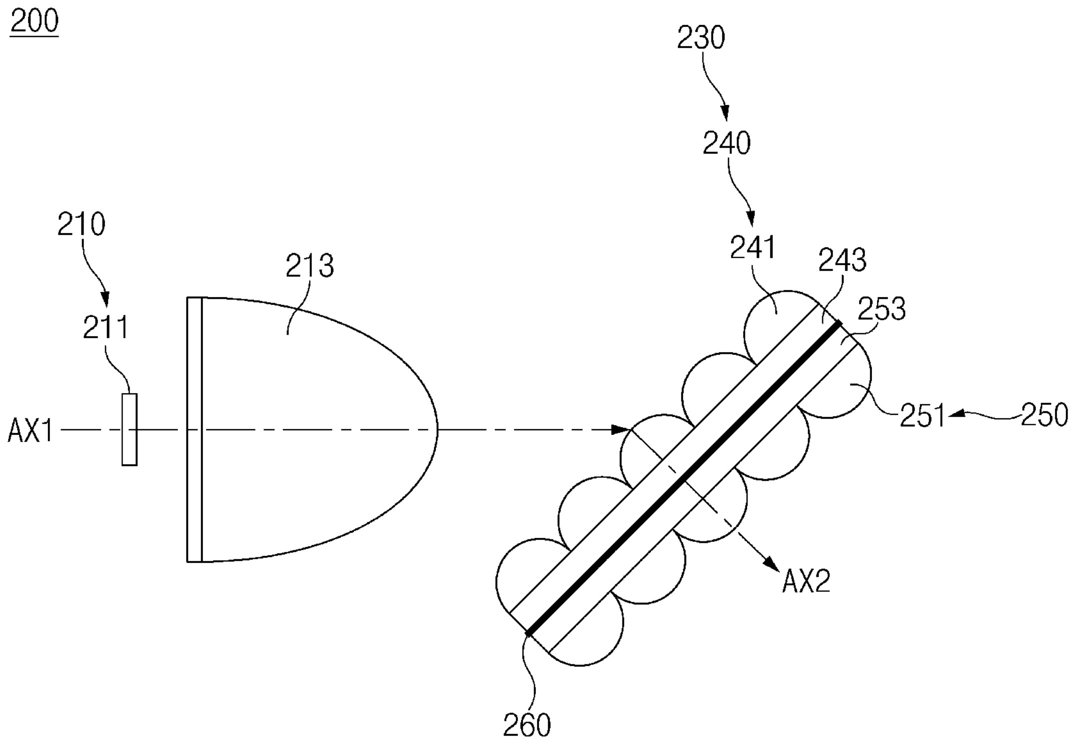
FIG. 11 is a side view illustrating a lamp for a vehicle according to a second embodiment of the present disclosure.
Figure 12:
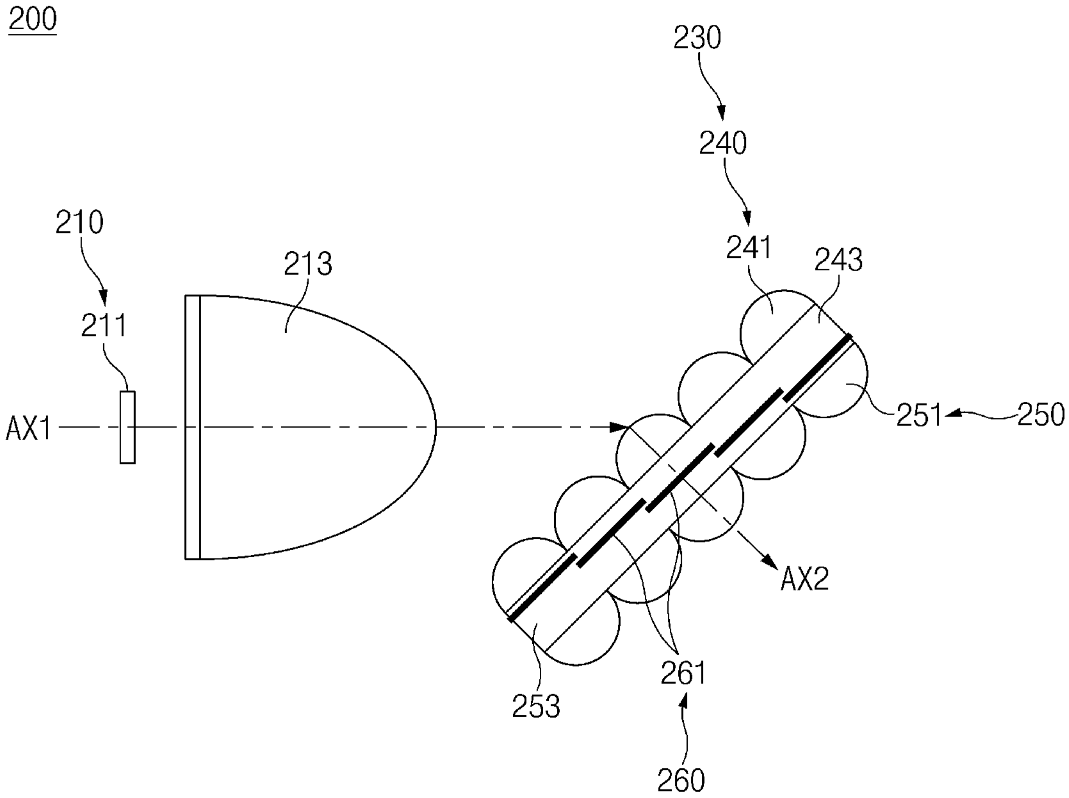
FIG. 12 is a side view illustrating a lamp for a vehicle according to a modification of the second embodiment of the present disclosure.
Figure 13:
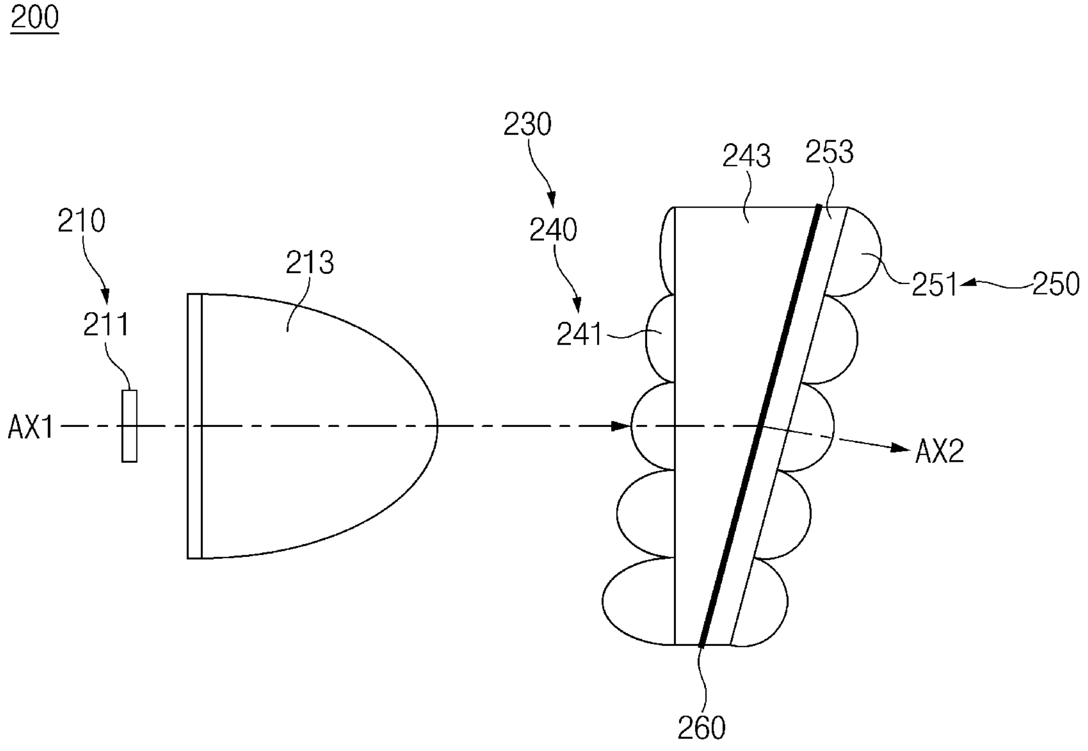
FIG. 13 is a side view illustrating a lamp for a vehicle according to another modification of the second embodiment of the present disclosure.
Figure 14:
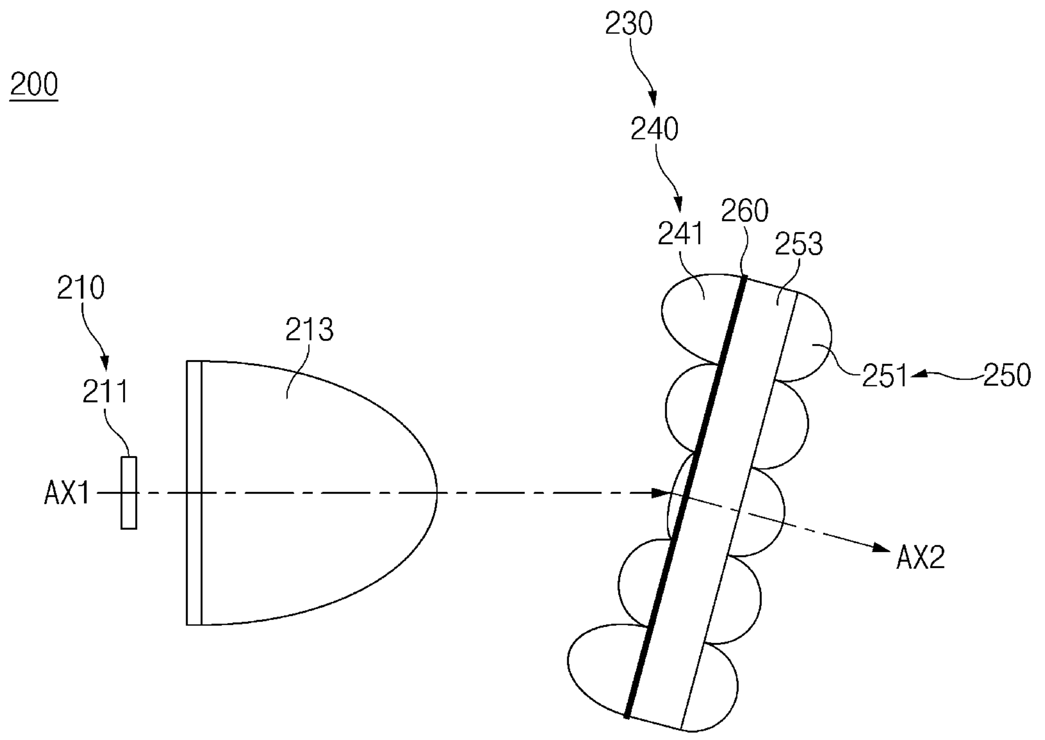
FIG. 14 is a side view illustrating a lamp for a vehicle according to another modification of the second embodiment of the present disclosure.

FIGS. 9 to 14 illustrate a second embodiment of the present disclosure. FIG. 9 is a view schematically illustrating a lamp for a vehicle according to a second embodiment of the present disclosure. FIG. 10 is a view schematically illustrating a lamp for a vehicle according to a comparative example of the present disclosure. FIG. 11 is a side view illustrating a lamp for a vehicle according to a second embodiment of the present disclosure. FIG. 12 is a side view illustrating a lamp for a vehicle according to a modification of the second embodiment of the present disclosure. FIG. 13 is a side view illustrating a lamp for a vehicle according to another modification of the second embodiment of the present disclosure. FIG. 14 is a side view illustrating a lamp for a vehicle according to another modification of the second embodiment of the present disclosure.

Referring to FIGS. 9 to 14, the lamp 200 for a vehicle according to the second embodiment of the present disclosure includes a light source part 210 and a lens array 230. Furthermore, the lamp 200 for a vehicle according to the second embodiment of the present disclosure may further include a shield part 260.

The light source part 210 is configured to generate and irradiate light. The lens array 230 is provided on a front side of the light source part 210 and is configured to output the light input from the light source part 210 to a front side.

For example, the light source part 210 may be configured to irradiate the light in a direction that faces the road surface 2. The light source part 210 may include a light source 211 and a collimator 213. For example, the light source 211 may be a light emitting diode (hereinafter, referred to as an "LED"), but the present disclosure is not limited thereto. The collimator 213 may convert the light radiated from the light source 211 to light that is parallel to an optical axis, and may input the light to a first lens part 240.

The lens array 230 includes the first lens part 240 and a second lens part 250.

The first lens part 240 includes a plurality of first micro lenses 241, to which the light is input from the light source part 210. The second lens part 250 includes a plurality of second micro lenses 251 that are configured to output the light that is input from the first lens part 240.

For example, each of the first micro lenses 241 may include an input surface 244 that is formed to be convex in a direction that faces the light source part 210, and the input surfaces 244 of the plurality of first micro lenses 241 may be collected to form the input surface 244 of the entire first lens part 240. Furthermore, each of the second micro lenses 251 may include an output surface 254 that is formed to be convex in the direction that faces the road surface 2, and the output surfaces 254 of the plurality of second micro lenses 251 may be collected to form the output surface 254 of the entire second lens part 250. Meanwhile, the shapes of the first micro lenses 241 and the second micro lenses 251 are not limited to the above description.

For example, the first lens part 240 may further include a first light transmitting body 243, and the first light transmitting body 243 may have the first micro lens 241 on a surface that faces the light source part 210 and may be formed of a material that transmits light.

Furthermore, for example, the second lens part 250 may further include a second light transmitting body 253, and the second micro lenses 251 may be formed on a surface that faces an opposite direction to the direction that faces the first light transmitting body 243 to transmit light. Furthermore, the second light transmitting body 253 may be configured to be opposite to the first light transmitting body 243 while the shield part 260 being interposed therebetween.

The first light transmitting body 243 and the second light transmitting body 253 may function as bodies for integrally forming the first lens part 240 and the second lens part 250. However, the present disclosure is not limited thereto, and when the first lens part 240 and the second lens part 250 are not integrally formed, at least one of the first light transmitting body 243 and the second light transmitting body 253 may be omitted.

Meanwhile, when an optical axis of the light output from the light source part 210 and input toward the first lens part 240 is defined as a first optical axis AX1 and an optical axis output from the second lens part 250 is defined as a second optical axis AX2, the lens array 230 is inclined in a direction, in which the second optical axis AX2 faces the road surface 2 with respect to the first optical axis AX1. Here, the first optical axis AX1 that is an optical axis of the light that is input toward the first lens part 240 may be an optical axis of the light that is output from the light source part 210.

In detail, in the lens array 230, an angle of the first optical axis AX1 that is the optical axis of the light that is input toward the first lens part 240 and an angle of the second optical axis AX2 that is the optical axis of the light that is output from the second lens part 250 are different. For example, the first optical axis AX1 may extend in parallel to the road surface 2, that is, in a lengthwise direction of the vehicle 1, and the second optical axis AX2 may extend toward the road surface 2 from the second lens part 250 to extend in a direction that is inclined with respect to the first optical axis AX1.

Accordingly, the beam pattern may be formed on the road surface 2 not by mounting all of the light source part 210 and the lens array 230 such that they are inclined toward the road surface 2 but by inclining only the second optical axis AX2 of the second lens part 250 when the light is irradiated to the road surface 2 to be inclined by using the lamp 200 for a vehicle according to the present disclosure. In this case, because a size M1 of the lens array 230 may be reduced, the lamp 200 for a vehicle may be miniaturized.

FIG. 10 illustrates a comparative example of the present disclosure. For convenience of description, reference numerals of the comparative example of the present disclosure are denoted by the same reference numerals of the present disclosure illustrated in FIG. 9. When the entire light source part 210 and the entire lens array 230 are mounted to be inclined toward the road surface 2 as in the comparative example, a size M2, in particular, the upward/downward height of the lamp 200 for a vehicle may be increased whereby a space occupied by the lamp in the vehicle 1 may be widened. Meanwhile, as in the embodiment of the present disclosure illustrated in FIG. 9, the lamp 200 for a vehicle may be miniaturized by inclining only the second optical axis AX2 of the second lens part 250 whereby a space occupied by the lamp 200 for the vehicle 1 may be reduced.

Here, a method for inclining the second optical axis AX2 of the second lens part 250 with respect to the first optical axis AX1 is not limited, and various schemes may be applied.

For example, referring to FIG. 11, the lens array 230 may be inclined with respect to a plane that is perpendicular to the first optical axis AX1 such that the second optical axis AX2 forms a specific angle with respect to the first optical axis AX1. In this case, all of the first micro lens 241, the first light transmitting body 243, the shield part 260, the second light transmitting body 253, and the second micro lens 251 may be disposed to be inclined with respect to the first optical axis AX1.

Accordingly, the second optical axis AX2 provided in the second lens part 250 may extend in a direction that is inclined with respect to the first optical axis AX1.

However, in this case, because the lens array 230 itself is inclined, incidence angles of the input light in all the areas of the first lens part 240 may become different. In particular, incidence angle of an upper area and a lower area of the first lens part 240 may become different. Accordingly, the amount of light or resolutions may become different in all the areas of the lens array 230. Accordingly, a measure for enhancing optical performance while inclining the second optical axis AX2 toward the road surface 2 with respect to the first optical axis AX1 is necessary.

Accordingly, the present disclosure may solve the above described problem by deforming the shapes of the shield part 260, the first micro lens 241, and the second micro lens 251.

For example, referring to FIG. 2, the shield part 260 may be located between the first lens part 240 and the second lens part 250, and may shield a portion of the light that is input from the first lens part 240 toward the second lens part 250 to form a specific beam pattern on the road surface 2.

Furthermore, the shield part 260 may further include a unit mask 261, and a plurality of unit masks 261 may be provided to correspond to the plurality of second micro lenses 251, respectively to form a masking pattern for forming the beam pattern.

The plurality of unit masks 261 may be disposed to become farther from the second micro lens 251 as they go toward the lower side of the lens array 230.

For example, the focuses of the second micro lenses 251 may be provided to be located on the unit mask 261. Furthermore, due to the disposition of the plurality of unit masks 261, the focuses of the second micro lenses 251 may become longer as they go toward the lower side of the lens array 230.

Accordingly, focal distances of the second micro lenses 251 may be larger as it goes to a lower side, and thus, differences of resolutions for the areas due to the inclination of the lens array 230 may be compensated for.

Furthermore, the radii of curvature of the plurality of second micro lenses 251 may become larger as they go downwards.

Accordingly, the focal distances of the second micro lenses 251 may be larger as it goes downwards, and thus, differences of resolutions for the areas due to the inclination of the lens array 230 may be compensated for.

Meanwhile, referring to FIG. 13, an input surface that is a surface of the first light transmitting body 243, which faces the light source part 210, may be formed to be perpendicular to the first optical axis AX1. Furthermore, an output surface that is a surface of the second light transmitting body 253, which faces an opposite direction to the direction that faces the light source part 210 may be inclined with respect to the input surface 244 such that it becomes closer to the input surface 244 as it goes downwards.

Furthermore, here, the shield part 260 may be configured to be parallel to the output surface 254.

In this case, because a shape of the second light transmitting body 253 and a coupling form of the second light transmitting body 253 has a trapezoidal shape, a size of which decreases as it goes downwards, the second optical axis AX2 of the second micro lens 251 may be inclined with respect to the first optical axis AX1 while the lens array 230 itself is not inclined. That is, because the first lens part 240 is not inclined with respect to the first optical axis AX1, optical loss due to the difference of incident angle may be minimized Furthermore, the radii of curvature of the plurality of first micro lenses 241 may become smaller as they go downwards.

In detail, as in the embodiment illustrated in FIG. 13, because the shield part 260 and the second micro lens 251 are inclined with respect to the first optical axis AX1, a distance between the first micro lens 241 and the shield part 260 may become smaller as it goes downwards. That is, differences of distances between the first micro lenses 241 and the shield part 260 occurs in all the areas of the lens array 230, and thus difference of the amounts of light may occur. Accordingly, the radii of curvature of the first micro lenses 241 may become gradually smaller as they go downwards, and thus, differences of the amounts of light due to the differences of the distances between the first micro lenses 241 and the shield part 260 may be compensated for.

Meanwhile, referring to FIG. 14, the shield part 260 may be disposed to be closer to the first micro lens 241 than to the second micro lens 251. As in the embodiment illustrated as an example, the shield part 260 may be directly attached to the first micro lens 241, but a location of the shield part 260 is not limited thereto.

In this way, when the shield part 260 is disposed to be adjacent or adhered to the first micro lenses 241, the focal distances of the second micro lenses 251 may become larger in all the areas of the lens array 230 whereby resolution may be compensated for.

Furthermore, in the embodiment illustrated in FIG. 14, the radii of curvature of the plurality of first micro lenses 241 may become gradually smaller as they become farther from the central portion, through which the first optical axis AX1 passes, when the lens array 230 is viewed from the rear side.

In detail, as the light that is input to the first lens part 240 from the light source part 210 becomes farther from the central portion, bigger light loss may be occur. Accordingly, a difference between the intensities of light of the beam patterns formed on the road surface 2 may occur. In the embodiment of the present disclosure, the amount of the light in an outskirt area of the first lens part 240 may be increased by making the radii of the first micro lenses 241 larger as they become farther from the central portion whereby loss of the amount of the light may be compensated for. Accordingly, the uniformity of the beam patterns formed on the road surface 2 may be enhanced.

When the lamp for a vehicle according to the second embodiment of the present disclosure is used, the size of the lens array may be minimized even when the lamp that forms the beam pattern by irradiating the light to the road surface such that the light is inclined whereby the lamp for a vehicle may be minimized.

Third Embodiment

Figure 15:
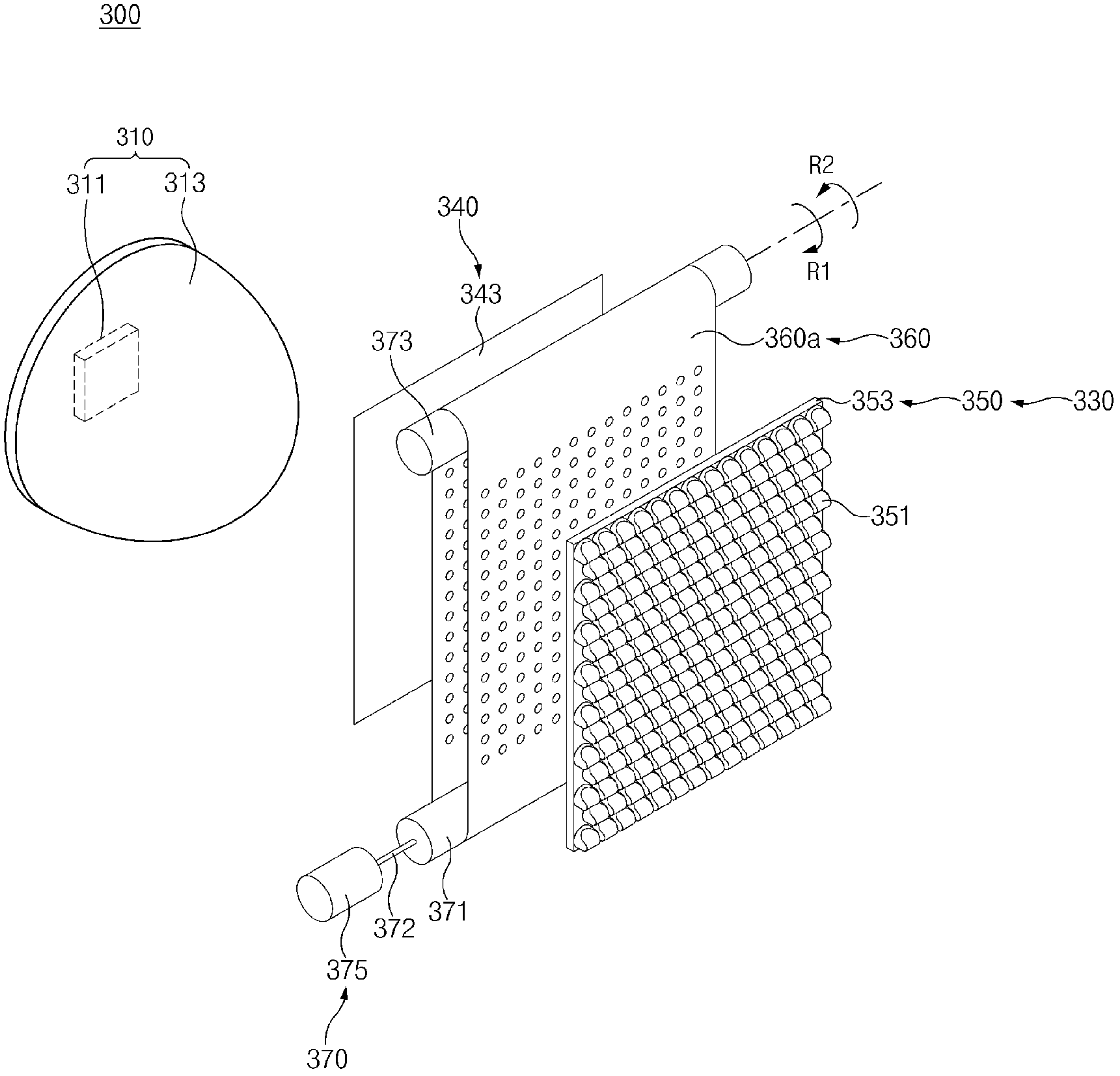
FIG. 15 is an exploded perspective view illustrating a lamp for a vehicle according to a third embodiment of the present disclosure.
Figure 16:
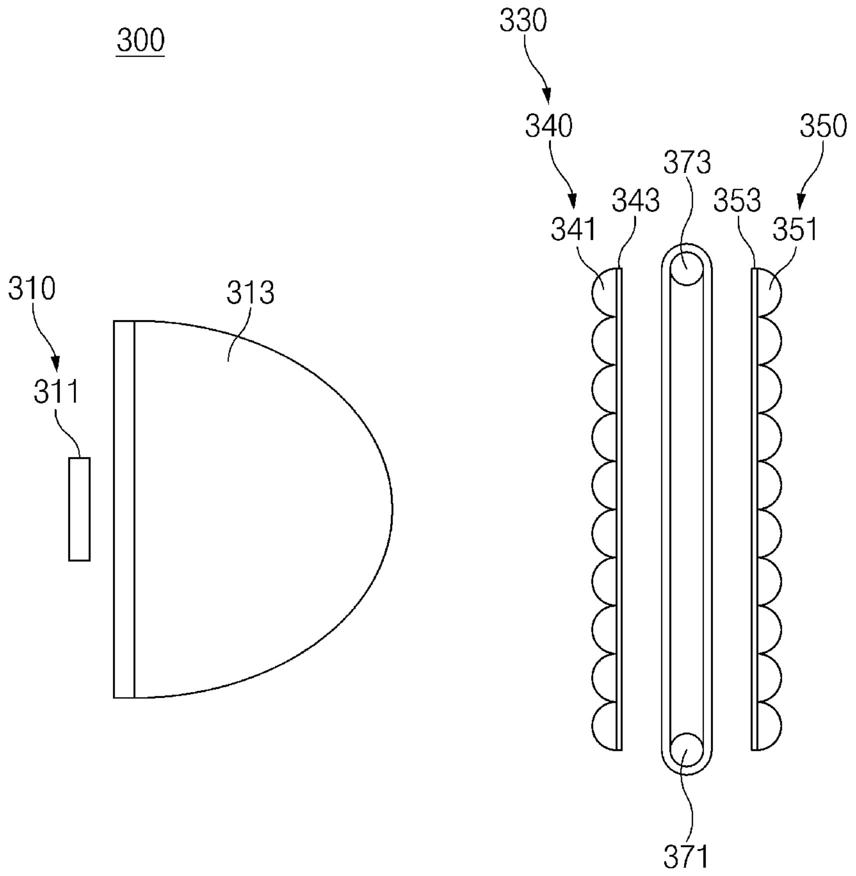
FIG. 16 is a view illustrating the lamp for a vehicle according to the third embodiment of the present disclosure, and is a view of FIG. 15, viewed from a lateral side.
Figure 17:
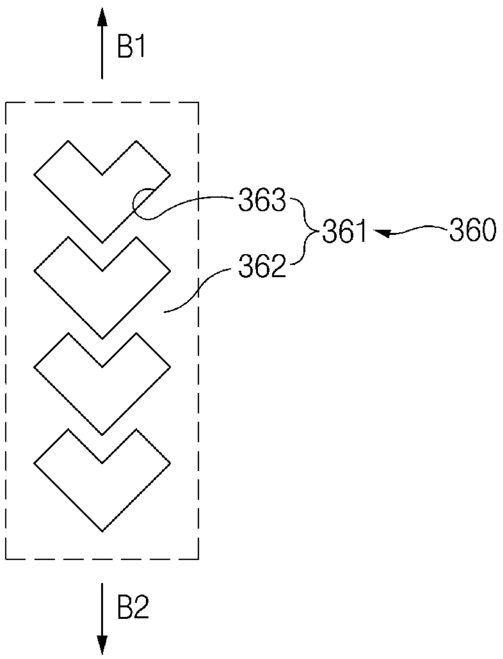
FIG. 17 illustrates an example of a unit mask formed in a shield body of FIG. 16.
Figure 18:
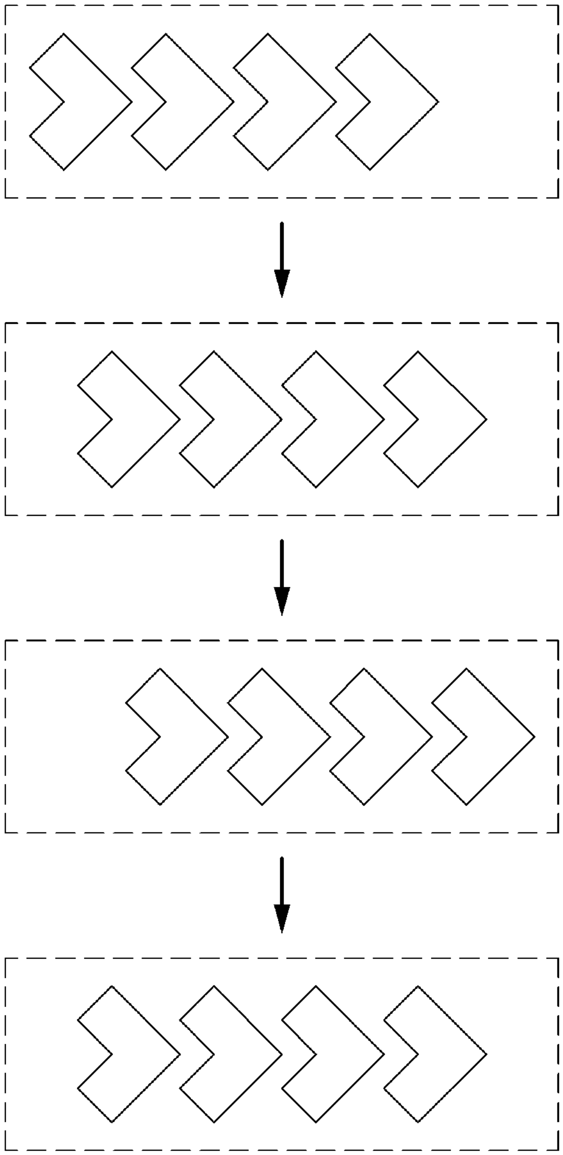
FIG. 18 illustrate beam patterns projected to a road surface.

FIGS. 15 to 18 illustrate a third embodiment of the present disclosure. FIG. 15 is an exploded perspective view illustrating a lamp for a vehicle according to a third embodiment of the present disclosure. FIG. 16 is a view illustrating the lamp for a vehicle according to the third embodiment of the present disclosure, and is a view of FIG. 15, viewed from a lateral side. FIG. 17 illustrates an example of a unit mask formed in a shield body of FIG. 16. FIG. 18 illustrate beam patterns projected to a road surface.

Referring to FIGS. 15 to 18, the lamp 300 for a vehicle according to the third embodiment of the present disclosure includes a light source part 310 and a lens array 330. Furthermore, the lamp 300 for a vehicle according to the third embodiment of the present disclosure may further include a shield part 360.

The light source part 310 is configured to generate and irradiate light. The lens array 330 is provided on a front side of the light source part 310 and is configured to output the light input from the light source part 310 to a front side.

For example, the light source part 310 may be configured to irradiate the light in a direction that faces the road surface 2. The light source part 310 may include a light source 311 and a collimator 313. For example, the light source 311 may be a light emitting diode (hereinafter, referred to as an "LED"), but the present disclosure is not limited thereto. The collimator 313 may convert the light radiated from the light source 311 to light that is parallel to an optical axis, and may input the light to a first lens part 340.

The lens array 330 includes the first lens part 340 and a second lens part 350.

The first lens part 340 includes a plurality of first micro lenses 341, to which the light is input from the light source part 310. The second lens part 350 includes a plurality of second micro lenses 351 that are configured to output the light that is input from the first lens part 340.

For example, each of the first micro lenses 341 may include an input surface that is formed to be convex in a direction that faces the light source part 310, and the input surfaces of the plurality of first micro lenses 341 may be collected to form an input surface of the entire first lens part 340. Furthermore, each of the second micro lenses 351 may include an output surface that is formed to be convex in the direction that faces the road surface 2, and the output surfaces of the plurality of second micro lenses 351 may be collected to form an output surface of the entire second lens part 350. Meanwhile, the shapes of the first micro lenses 341 and the second micro lenses 351 are not limited to the above description.

For example, the first lens part 340 may further include a first light transmitting body 343, and the first light transmitting body 343 may have the first micro lens 341 on a surface that faces the light source part 310 and may be formed of a material that transmits light.

Furthermore, for example, the second lens part 350 may further include a second light transmitting body 353, and the second micro lenses 351 may be formed on a surface that faces an opposite direction to the direction that faces the first light transmitting body 343 to transmit light. Furthermore, the second light transmitting body 353 may be configured to be opposite to the first light transmitting body 343 while the shield part 360 being interposed therebetween.

The first light transmitting body 343 and the second light transmitting body 353 may function as bodies for integrally forming the first lens part 340 and the second lens part 350. However, the present disclosure is not limited thereto, and when the first lens part 340 and the second lens part 350 are not integrally formed, at least one of the first light transmitting body 343 and the second light transmitting body 353 may be omitted.

Meanwhile, the shield part 360 may be located between the first lens part 340 and the second lens part 350, and may shield a portion of the light that is input from the first lens part 340 to the second lens part 350 to form a specific beam pattern on the road surface 2.

In detail, the shield part 360 may include a unit mask 361. A plurality of unit masks 361 may be provided to correspond to the plurality of second micro lenses 351, respectively, and a masking pattern for forming the beam pattern may be formed. That is, the unit masks 361 may be provided to correspond to the second micro lenses 351 disposed on an output side of the lens array 330, respectively.

In more detail, each of the unit masks 361 may include a shield area 362 that is configured to shield the light, and a through area 363 that is configured such that the light passes therethrough and has a shape corresponding to the masking pattern. According to the shape of the through area 363, that is, the shape of the masking pattern, an image of the beam pattern that is projected to the road surface 2 may be changed. The unit mask 361 may have a plate shape as an example, and the specific beam pattern may be formed by masking the light in the shield area 362.

Furthermore, the shield part 360 may be provided to be movable to convert a lamp image of the beam pattern formed on the road surface 2.

In detail, because the masking pattern that determines an image of the beam pattern that is projected to the road surface 2 is formed in a shield body **360*a* of the shield part 360, the image of the beam pattern may be converted when the shield body 360*a* is moved while the light is irradiated to the road surface 2 from the lamp 300 for a vehicle. Accordingly, the beam pattern may be converted to a dynamic image. Furthermore, the shield part 360 may make the beam pattern formed when the lamp is turned on different whenever the lamp is turned on because the shield body 360*a*** is provided to be movable.

Accordingly, according to the third embodiment of the present disclosure, an effect of calling attention of a counterpart drive by implementing the beam pattern formed on the road surface 2 with the dynamic image whereby visibility may be enhanced.

Furthermore, according to the third embodiment of the present disclosure, the intuitiveness of acquisition of information may be enhanced when a counterpart driver or surrounding persons are informed of information, such as a travel direction of the vehicle 1, by implementing the beam pattern with the dynamic image.

Meanwhile, the lamp 300 for a vehicle according to the third embodiment of the present disclosure may further include a driving part 370. The driving part 370 may provide driving power such that the shield part 360 is movable.

In detail, the driving part 370 may include a pair of rollers 371 and 373 and an actuator 375.

The pair of rollers 371 and 373 may be configured to be spaced apart from each other in the upward/downward direction, and may be configured such that a portion of an outer surface thereof is adhered to the shield body **360*a***.

Here, the pair of rollers 371 and 373 may be provided in parallel to each other, and may be provided at an upper end and a lower end of the shield body **360*a*. However, the dispositions of the rollers 371 and 373** are not limited thereto.

In detail, the shield body **360*a* may have a plate shape having a large width, and may be formed of a flexible material such that an upper end and a lower end thereof is caught by the pair of rollers 371 and 373. When the rollers 371 and 373 are driven and rotated, the shield body 360*a* may be movable, and then, the image of the beam pattern may be converted while the unit mask 361 formed in the shield body 360*a*** is moved.

The actuator 375 may be connected to a rotary shaft 375 of any one of the pair of rollers 371 and 373 to rotate the rollers 371 and 373, and the shield body **360*a* may be configured to be rotated together when the rollers 371 and 373 are rotated. For example, the actuator 375** may be automatically driven by a controller.

Meanwhile, the driving part 370 may be configured to change rotational speeds of the rollers 371 and 373. Accordingly, a movement speed of the shield body **360*a*** also may be changed.

For example, the driving part 370 may adjust a speed of conversion of the dynamic image of the beam pattern through adjustment of an RPM of the actuator 375. Furthermore, the driving part 370 may be stopped or driven at a high speed of a specific speed or more to implement a static constant lighting image.

Meanwhile, for example, the masking patterns formed in the plurality of unit masks 361, respectively, may be the same image.

In detail, in the plurality of unit masks 361, the shapes of the through areas 363 may be the same. Accordingly, focuses of all the second micro lenses 351 may form pairs with the unit masks 361 formed with the same masking pattern image.

Then, curvatures of the plurality of second micro lenses 351 may be the same.

Furthermore, the focuses of the second micro lenses 351 may be located on the shield parts 360. Furthermore, the shield parts 360 may be configured such that the shapes of the masking patterns of the unit masks 361 located on the focuses of the plurality of second micro lenses 351 at an arbitrary time point are always the same when the actuator 375 is driven.

Accordingly, according to the third embodiment of the present disclosure, the images of the beam patterns projected through the plurality of second micro lenses 351 at an arbitrary moment may be implemented to be the same.

Meanwhile, referring to FIGS. 15 and 16, the shield part 360, as in the illustrated embodiment, may include a rear part that faces the first micro lens 341 with respect to the rollers 371 and 373 at an arbitrary time point, and a front part that faces the second micro lens 351.

Furthermore, the unit mask 361 located on the focus of the second micro lens 351 may be located on the front part.

Hereinafter, conversion of the beam pattern by the lamp 300 for a vehicle according to the third embodiment of the present disclosure will be described with reference to FIGS. 17 and 18. FIG. 17 illustrates an example of the unit mask 361 formed in the shield body 360*a*, and FIG. 18 illustrate the beam pattern projected to the road surface 2 through one second micro lens 351.

When the pair of rollers 371 and 373 are rotated forwardly or reversely by the actuator 375 (see directions R1 and R2 of FIG. 15), as illustrated in FIG. 17, the unit masks 361 may be moved in the upward/downward direction as the shield body 360*a* is moved (see directions B1 and B2).

Accordingly, as illustrated in FIG. 18, the beam pattern projected to the road surface 2 is changed over time. As an example, as time elapses, the beam pattern implemented through the one second micro lens 351 may be sequentially changed as in FIG. 18.

However, the shape or image conversion form of the masking pattern of the unit mask 361 according to the present disclosure is not limited to the illustrated embodiment.

According to the third embodiment of the present disclosure, an effect of calling attention of a counterpart drive by implementing the beam pattern formed on the road surface with the dynamic image whereby visibility may be enhanced.

Furthermore, according to the third embodiment of the present disclosure, the intuitiveness of acquisition of information may be enhanced when a counterpart driver or surrounding persons are informed of information, such as a travel direction of the vehicle, by implementing the beam pattern with the dynamic image.

Fourth Embodiment

Figure 19:
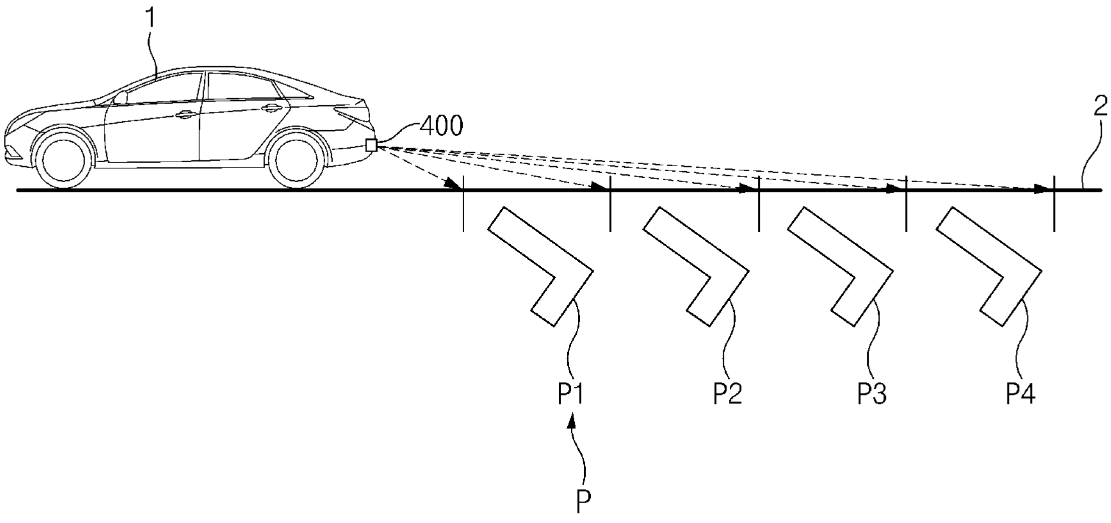
FIG. 19 is a view illustrating an example, in which a lamp for a vehicle according to a fourth embodiment of the present disclosure is installed in a vehicle.
Figure 20:
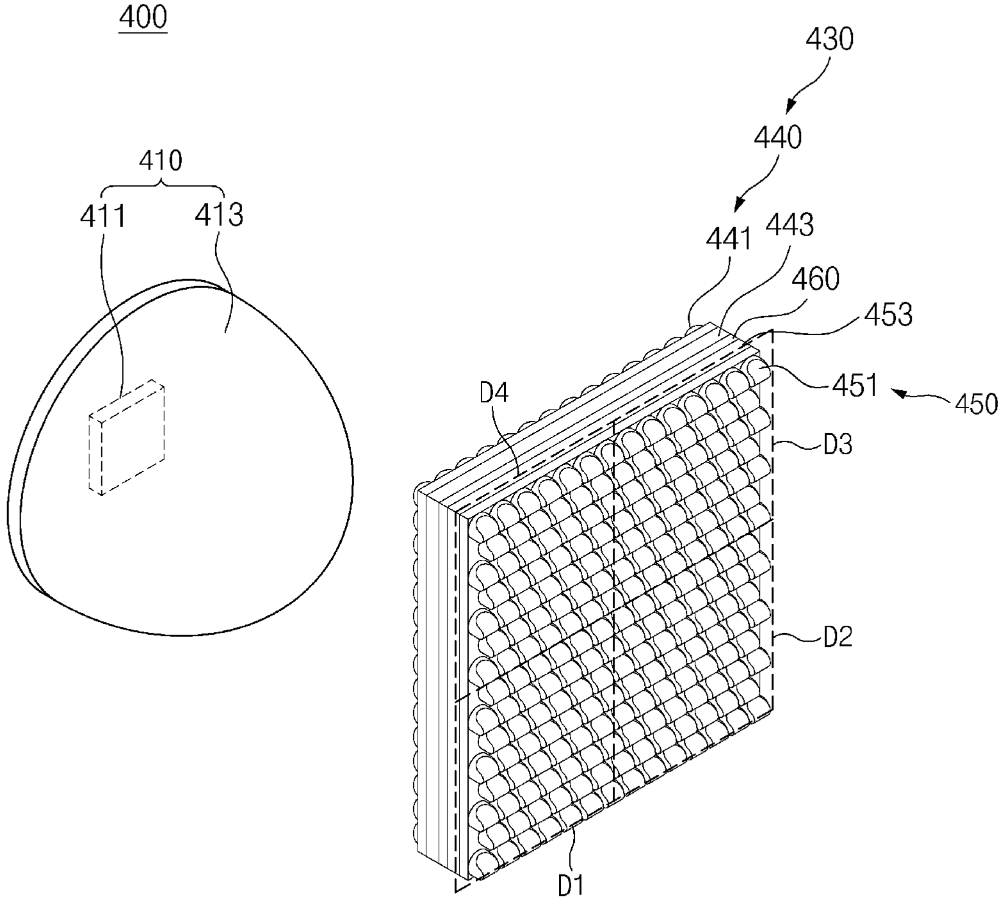
FIG. 20 is a perspective view illustrating the lamp for a vehicle according to the fourth embodiment of the present disclosure.
Figure 21:
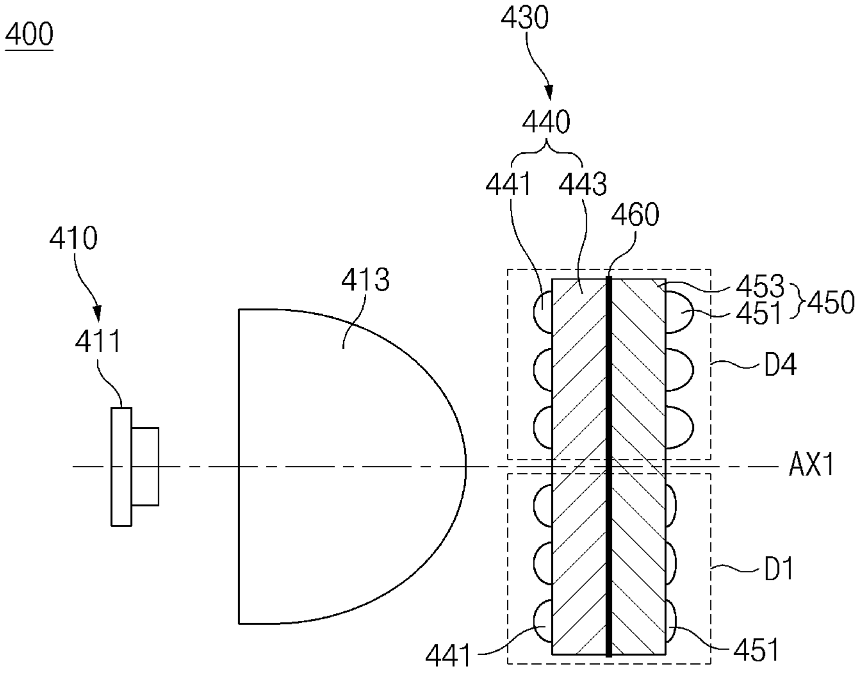
FIG. 21 is a side cross-sectional view illustrating the lamp for a vehicle according to the fourth embodiment of the present disclosure.
Figure 22A:
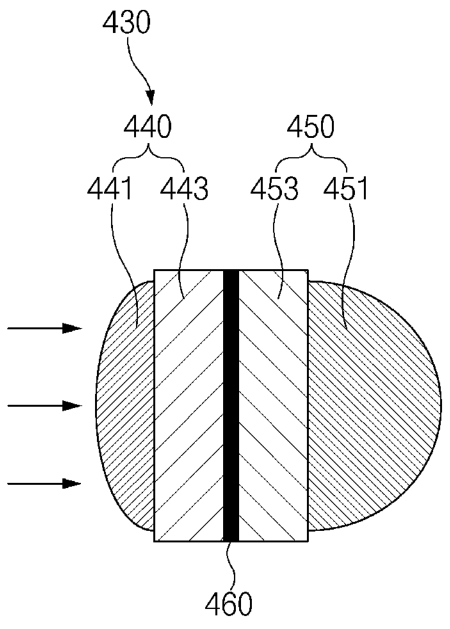
FIG. 22A illustrates a portion of a first division area of a lens array according to the fourth embodiment of the present disclosure.
Figure 22B:
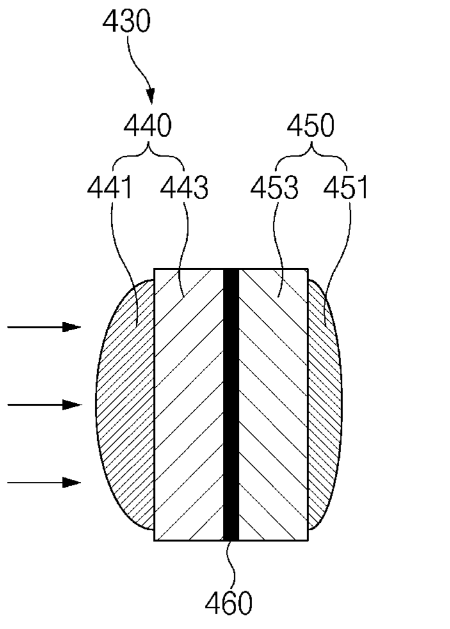
FIG. 22B illustrates a portion of a fourth division area of the lens array according to the fourth embodiment of the present disclosure.
Figure 23:
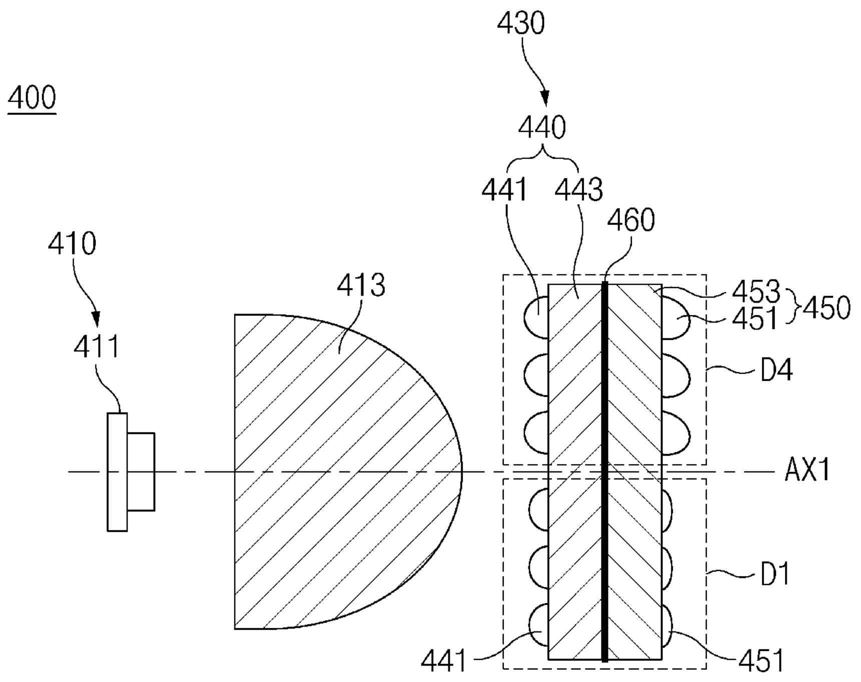
FIG. 23 is a side cross-sectional view illustrating a lamp for a vehicle according to a modification of the fourth embodiment of the present disclosure.
Figure 24A:
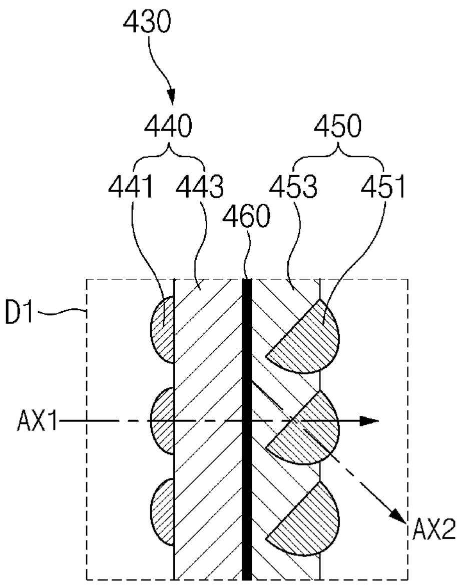
FIG. 24A is an enlarged cross-sectional view illustrating a first division area of the lens array according to the fourth embodiment of the present disclosure.
Figure 24B:
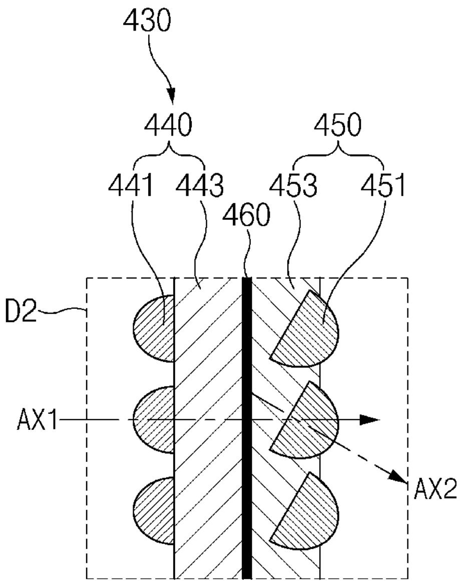
FIG. 24B is an enlarged cross-sectional view illustrating a second division area of the lens array.
Figure 24C:
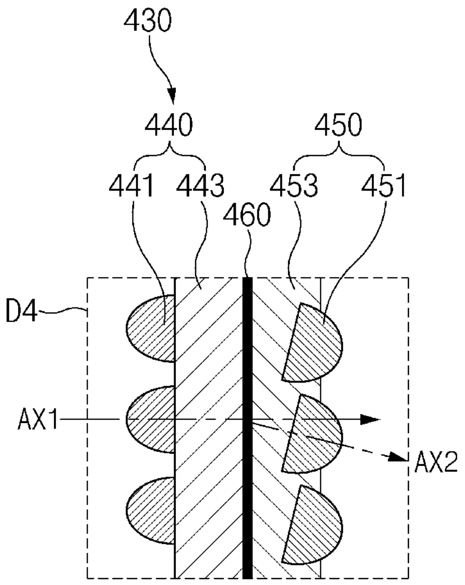
FIG. 24C is an enlarged cross-sectional view illustrating a fourth division area of the lens array.
Figure 25:
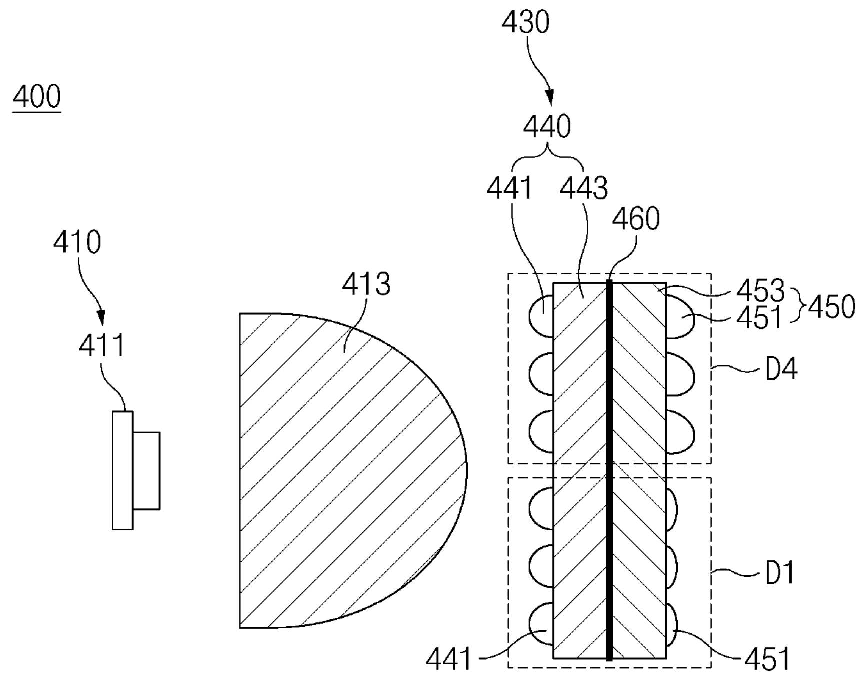
FIG. 25 is a side cross-sectional view illustrating a lamp for a vehicle according to another modification of the fourth embodiment of the present disclosure.
Figure 26:
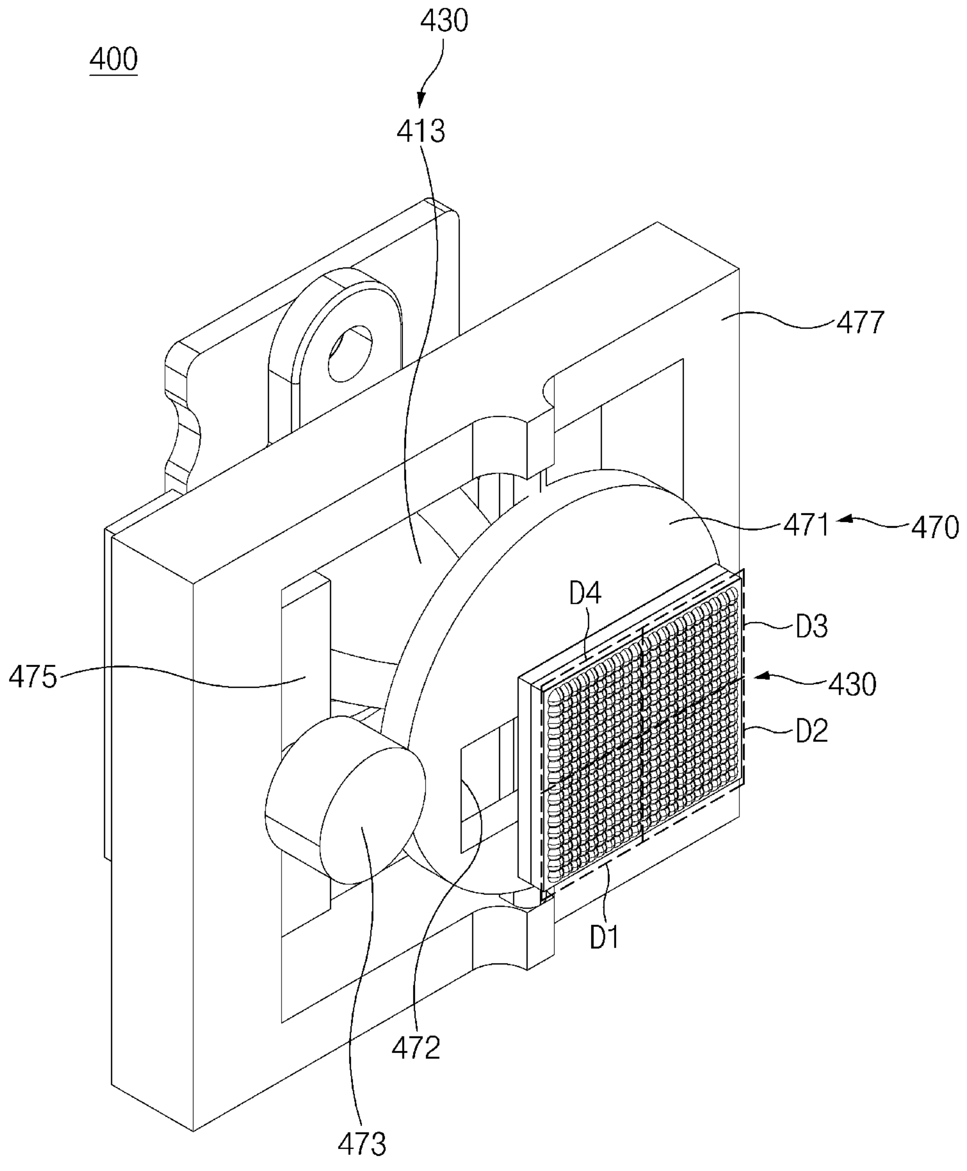
FIG. 26 is a perspective view illustrating a lamp for a vehicle according to another modification of the second embodiment of the present disclosure.
Figure 27:
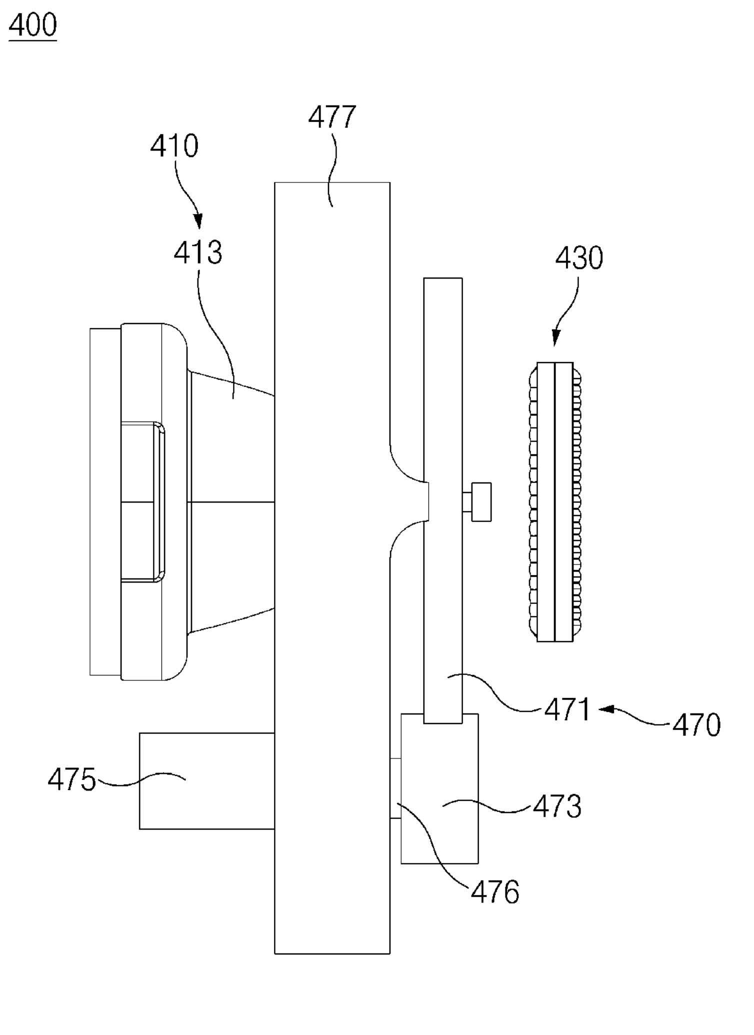
FIG. 27 is aside view illustrating the lamp for a vehicle illustrated in FIG. 26, when viewed from a lateral side.
Figure 28:
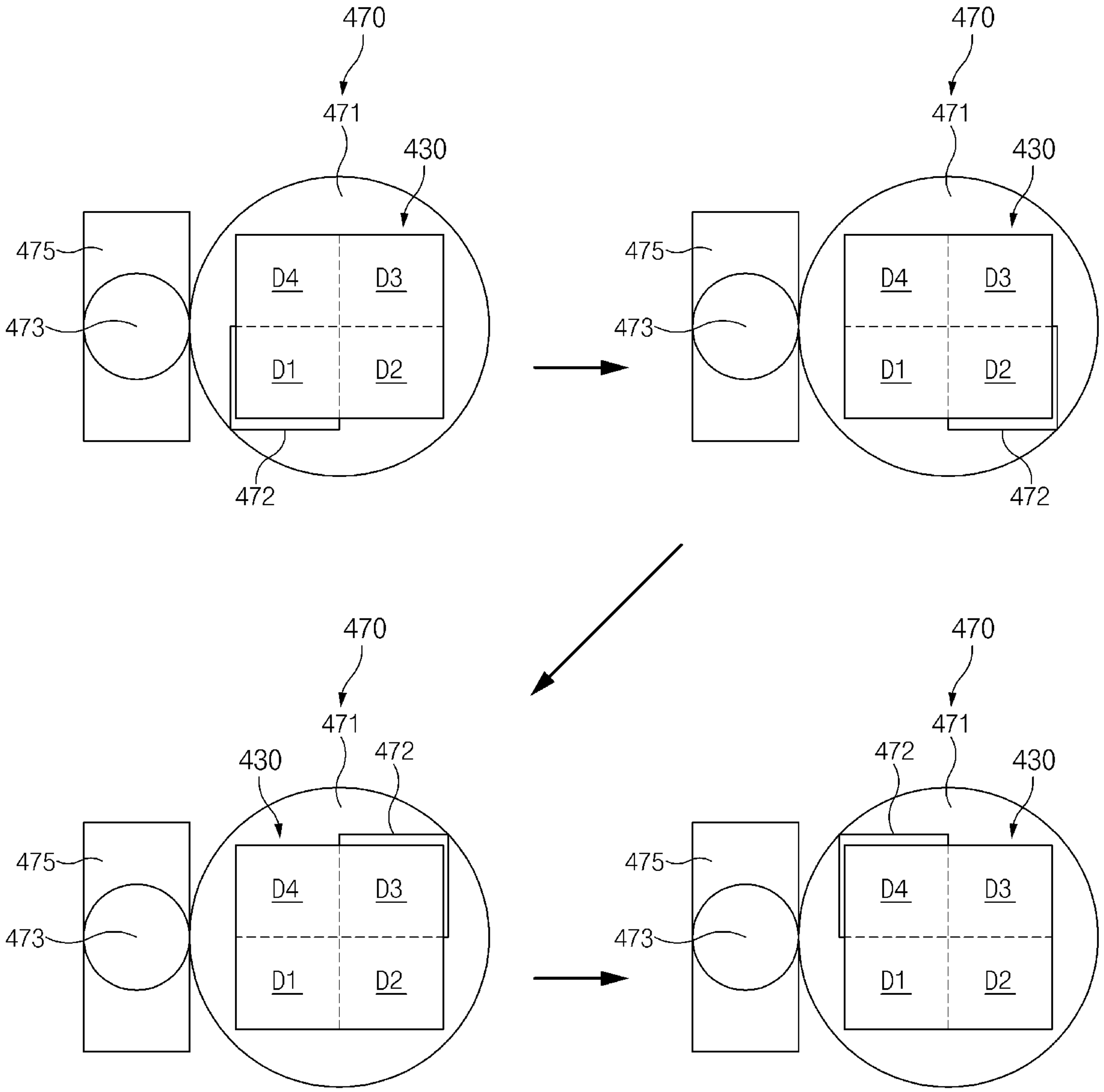
FIG. 28 are views illustrating an operation of a lamp for a vehicle according to another modification of the fourth embodiment of the present disclosure.

FIGS. 19 to 28 illustrate a fourth embodiment of the present disclosure. FIG. 19 is a view illustrating an example, in which a lamp for a vehicle according to a fourth embodiment of the present disclosure is installed in a vehicle. FIG. 20 is a perspective view illustrating the lamp for a vehicle according to the fourth embodiment of the present disclosure. FIG. 21 is a side cross-sectional view illustrating the lamp for a vehicle according to the fourth embodiment of the present disclosure. FIG. 22A illustrates a portion of a first division area of a lens array according to the fourth embodiment of the present disclosure, and FIG. 22B illustrates a portion of a fourth division area of the lens array according to the fourth embodiment of the present disclosure. FIG. 23 is a side cross-sectional view illustrating a lamp for a vehicle according to a modification of the fourth embodiment of the present disclosure. FIG. 24A is an enlarged cross-sectional view illustrating a first division area of the lens array according to the fourth embodiment of the present disclosure, FIG. 24B is an enlarged cross-sectional view illustrating a second division area of the lens array, and FIG. 24C is an enlarged cross-sectional view illustrating a fourth division area of the lens array. FIG. 25 is a side cross-sectional view illustrating a lamp for a vehicle according to another modification of the fourth embodiment of the present disclosure. FIG. 26 is a perspective view illustrating a lamp for a vehicle according to another modification of the second embodiment of the present disclosure. FIG. 27 is a side view illustrating the lamp for a vehicle illustrated in FIG. 26, when viewed from a lateral side. FIG. 28 are views illustrating an operation of a lamp for a vehicle according to another modification of the fourth embodiment of the present disclosure.

Referring to FIGS. 19 to 28, the lamp 400 for a vehicle according to the fourth embodiment of the present disclosure includes a light source part 410 and a lens array 430. Furthermore, the lamp 400 for a vehicle according to the fourth embodiment of the present disclosure may further include a shield part 460.

The light source part 410 is configured to generate and irradiate light. The lens array 430 is provided on a front side of the light source part 410 and is configured to output the light input from the light source part 410 to a front side.

For example, the light source part 410 may be configured to irradiate the light in a direction that faces the road surface 2. The light source part 410 may include a light source 411 and a collimator 413. For example, the light source 411 may be a light emitting diode (hereinafter, referred to as an "LED"), but the present disclosure is not limited thereto. The collimator 413 may convert the light radiated from the light source 411 to light that is parallel to an optical axis AX1, and may input the light to a first lens part 440.

The lens array 430 includes the first lens part 440 and a second lens part 450.

The first lens part 440 includes a plurality of first micro lenses 441, to which the light is input from the light source part 410. The second lens part 450 includes a plurality of second micro lenses 451 that are configured to output the light that is input from the first lens part 440.

For example, each of the first micro lenses 441 may include an input surface that is formed to be convex in a direction that faces the light source part 410, and the input surfaces of the plurality of first micro lenses 441 may be collected to form an input surface of the entire first lens part 440. Furthermore, each of the second micro lenses 451 may include an output surface that is formed to be convex in the direction that faces the road surface 2, and the output surfaces of the plurality of second micro lenses 451 may be collected to form an output surface of the entire second lens part 450. Meanwhile, the shapes of the first micro lenses 441 and the second micro lenses 451 are not limited to the above description.

For example, the first lens part 440 may further include a first light transmitting body 443, and the first light transmitting body 443 may have the first micro lens 441 on a surface that faces the light source part 410 and may be formed of a material that transmits light.

Furthermore, for example, the second lens part 450 may further include a second light transmitting body 453, and the second micro lenses 451 may be formed on a surface that faces an opposite direction to the direction that faces the first light transmitting body 443 to transmit light. Furthermore, the second light transmitting body 453 may be configured to be opposite to the first light transmitting body 443 while the shield part 460 being interposed therebetween.

The first light transmitting body 443 and the second light transmitting body 453 may function as bodies for integrally forming the first lens part 440 and the second lens part 450. However, the present disclosure is not limited thereto, and when the first lens part 440 and the second lens part 450 are not integrally formed, at least one of the first light transmitting body 443 and the second light transmitting body 453 may be omitted.

Meanwhile, the beam pattern "P" is divided into a plurality of pattern areas P1, P2, P3, and P4 according to a distance from the lamp 400 for a vehicle, and the lens array 430 is divided into a plurality of division areas D1, D2, D3, and D4 corresponding to the plurality of pattern areas, respectively.

Furthermore, the focal distances of the second micro lenses 451 provided in the division areas corresponding to the pattern areas may become larger as the distances of the pattern areas from the lamp 400 for a vehicle become larger.

Furthermore, the curvatures of the second micro lenses 451 provided in the division areas corresponding to the pattern areas may become smaller as the distances of the pattern areas from the lamp 400 for a vehicle become larger.

In detail, when a direction that becomes farther from the lamp in the beam pattern is defined as a long-distance direction, and an opposite direction to the long-distance direction is defined as a short-distance direction, the curvatures of the second micro lenses 451 of the division area corresponding to the plurality of patterns of the beam pattern "P" may become smaller as the pattern areas go in the long distance direction.

Furthermore, the thicknesses of the second micro lenses 451 provided in the division areas corresponding to the pattern areas may become larger as the distances of the pattern areas from the lamp 400 for a vehicle become larger. That is, the thicknesses of the second micro lenses 451 of the division areas may become larger as the plurality of pattern areas of the beam pattern "P" go in the long-distance direction.

Then, for example, the first micro lenses 441 and the second micro lenses 451 provided in the same areas may have the same upward/downward width within a machining error range. However, the widths of the first micro lenses 441 and the second micro lenses 451 are not limited to the above description.

In detail, as the curvatures of the second micro lenses 451 become smaller, the focal distances of the second micro lenses 451 may become larger. Further, as the thicknesses of the second micro lenses 451 become larger, the focal distances of the second micro lenses 451 may become larger. As the focal distances become larger, the intensities of light become higher and the fields of view (FOVs) become smaller.

In this way, according to the present disclosure, it may be designed that the focal distances become larger as the distances from the lamp 400 for a vehicle become larger, and thus, the intensities of light of the pattern areas formed in the long-distance direction may be increased. That is, according to the present disclosure, the first micro lenses 441 and the second micro lenses 451 may be designed separately for the division areas to implement an optical system having an optimized field of view and an optimized intensity of light.

Accordingly, according to the present disclosure, the optical uniformity of the beam pattern "P" irradiated to the road surface 2 may be enhanced.

For example, referring to FIGS. 19 to 22, the plurality of division areas according to the fourth embodiment of the present disclosure may be disposed in quadrants obtained by dividing the lens array 430 with respect to the optical axis AX1 of the light source part 410.

Furthermore, the plurality of division areas D1, D2, D3, and D4 may be configured such that a pattern area, of which a distance from the lamp 400 for a vehicle becomes larger as it goes in the counterclockwise direction with respect to the division area D1 corresponding to a pattern area, of which a distance from the lamp 400 for a vehicle becomes smaller.

In detail, the lens array 430 may include a first division area D1, a second division area D2, a third division area D3, and a fourth division area D4, which are sequentially disposed in the counterclockwise direction. Here, the first division area D1 may be a division area corresponding to the first pattern area P1 that is a pattern area that is closest to the lamp 400 for a vehicle. Furthermore, as an example, the first to fourth division areas D1 to D4 may have the same size.

Furthermore, the beam pattern "P" may include a first pattern area P1 corresponding to the first division area D1, a second pattern area P2 corresponding to the second division area D2, a third pattern area P3 corresponding to the third division area D3, and a fourth pattern area P4 corresponding to the fourth division area D4. A distance from the lamp 400 for a vehicle may become larger as it goes from the first pattern area P1 to the fourth pattern area P4.

The first division area D1 is disposed on a lower side of the side surface of the lens array 430 illustrated in FIG. 21, and the fourth division area D4 is disposed on an upper side thereof. FIG. 22A illustrates a portion of the first division area D1 of the lens array 430 according to the fourth embodiment of the present disclosure, and FIG. 22B illustrates a portion of the fourth division area D4 of the lens array 430 according to the fourth embodiment of the present disclosure.

Referring to FIG. 21 to FIG. 22, the curvatures of the second micro lenses 451 may become smaller and the focal distances of the second micro lenses 451 may become larger as they go from the first division area D1 to the fourth division area D4. Accordingly, the brightness of the first to fourth pattern areas P1 to P4 may become uniform.

Meanwhile, referring to FIGS. 23 and 24, the curvatures of the first micro lenses 441 provided in the division areas corresponding to the pattern areas may become smaller as the distances of the pattern areas from the lamp 400 for a vehicle become larger.

As the curvatures of the first micro lenses 441 become larger, the amount of the light that is input through the first micro lenses 441 may be increased. Accordingly, the amount of the light may be increased in the division area corresponding to the pattern area disposed in the long-distance direction, and thus, the brightness of the pattern area disposed in the long-distance direction may be increased.

However, the curvatures of the first micro lenses 441 of the division area are not limited thereto, and as in the embodiment illustrated in FIG. 25, the curvatures of the first micro lenses 441 in the division areas may be the same. For example, when it is designed such that the optical uniformity is sufficiently enhanced due to the thicknesses or curvatures of the second micro lenses 451, the curvatures of the first micro lenses 441 may be the same.

Meanwhile, referring to FIGS. 23 to 25, when an optical axis of the light output from the light source part 410 and input toward the first lens part 440 is defined as a first optical axis AX1 and an optical axis output from the second lens part 450 is defined as a second optical axis AX2, the lens array 430 may extend in a direction, in which the second optical axis AX2 is inclined toward a road surface with respect to the first optical axis AX1.

In detail, in the lens array 430, an angle of the first optical axis AX1 that is the optical axis of the light that is input toward the first lens part 440 and an angle of the second optical axis AX2 that is the optical axis of the light that is output from the second lens part 450 are different. For example, the first optical axis AX1 may extend in parallel to the road surface 2, that is, in a lengthwise direction of the vehicle 1, and the second optical axis AX2 may extend toward the road surface 2 from the second lens part 450 to extend in a direction that is inclined with respect to the first optical axis AX1.

Accordingly, the beam pattern "P" may be formed on the road surface 2 not by mounting all of the light source part 410 and the lens array 430 such that they are inclined toward the road surface 2 but by inclining only the second optical axis AX2 of the second lens part 450 when the light is irradiated to the road surface 2 to be inclined by using the lamp 400 for a vehicle according to the present disclosure. In this case, as compared with a case, in which the light source part 410 and the entire lens array 430 are inclined toward the road surface 2, when the light source part 410 and the entire lens array 430 are mounted to be inclined toward the road surface 2, the upward/downward height of the lens array 430 may be lowered whereby the lamp 400 for a vehicle may be miniaturized.

FIG. 24A illustrates the first division area D1, FIG. 24B illustrates the second division area D2, and FIG. 24C illustrates the fourth division D4. As illustrated in FIGS. 24A to 24C, when the distances of the pattern areas from the lamp 400 for a vehicle become larger, the size of, among angles formed by the first optical axis AX1 and the second optical axis AX2, an astute angle becomes smaller in the corresponding division areas.

In detail, as the pattern areas are formed in the long-distance direction, an inclination of the second optical axis AX2 with respect to the first optical axis AX1 in the division areas may become smaller. In other words, as the pattern areas are formed in the long-distance direction, the second optical axis AX2 with respect to the first optical axis AX1 may become gradually more parallel to each other in the division areas.

Here, a method for inclining the second optical axis AX2 of the second lens part 450 with respect to the first optical axis AX1 is not limited, and various schemes may be applied.

For example, the second lens part 450 may further include the second light transmitting body 453, and the second light transmitting body 453 may have the second micro lenses 451 on a surface that faces an opposite direction to the direction that faces the light source part 410 to transmit light. Furthermore, the second micro lenses 451 may be provided in the second light transmitting body 453 such that the thickness direction of the second micro lenses 451 is inclined with respect to the first optical axis AX1.

Accordingly, the second optical axis AX2 provided in the second lens part 450 may extend in a direction that is inclined with respect to the first optical axis AX1.

Meanwhile, referring to FIGS. 26 to 28, the lamp 400 for a vehicle according to the fourth embodiment of the present disclosure may further include a driving shield unit 470.

The driving shield unit 470 may include a rotary shield 471. The rotary shield 471 may be disposed between the light source part 410 and the lens array 430. Furthermore, the rotary shield 471 may pass through an opening 472 having a size corresponding to any one of the plurality of division areas, and may be configured to be rotatable.

In detail, the rotary shield 471 may have a disk shape that is perpendicular to the optical axis of the light source part 410. Furthermore, the driving shield unit 470 may include a driving motor 475 that provides driving power, and transmission gears 473 that are connected to a driving shaft 476 of the driving motor 475 and are engaged with gears formed at a periphery of the rotary shield 471. Furthermore, the driving shield unit may further include a driving frame 477, on which the driving motor 475 is mounted.

When the driving motor 475 is driven, the transmission gears 473 connected to the driving shaft 476 may be rotated, and then, the rotary shield 471 engaged with the transmission gear 473 may be rotated. The light that is input from the light source part 410 may pass through the opening 472 of the rotary shield 471 and may be projected to a front side, and the light may be shielded in areas other than the opening 472. The location of the opening 472 may be changed as the rotary shield 471 is rotated. Accordingly, among the areas of the lens array 430, an area, to which the light is input from the light source part 410, also is changed.

In this way, the driving shield unit 470 may be configured to convert the lamp image of the beam pattern "P" by changing the location of the opening 472 through rotation of the rotary shield 471.

For example, the driving shield unit 470 may rotate the rotary shield 471 such that the opening 472 sequentially corresponds to the first to fourth division areas D1 to D4. (See FIG. 28).

Furthermore, for example, the driving motor 475 may adjust the rotational speed or the rotary shield 471, and may rotate the rotary shield 471 intermittently or continuously. As an example, when the rotary shield 471 is rotated intermittently, the first to fourth pattern areas P1 to P4 may be sequentially implemented. Furthermore, when the rotary shield 471 is rotated continuously, the beam pattern "P may implement a dynamic image. When the rotary shield 471 is rotated rapidly at a specific speed or more, all of the first to fourth pattern areas P1 to P4 are implemented simultaneously whereby a static image may be implemented.

The lamp for a vehicle according to the fourth embodiment of the present disclosure may be designed such that the focal distances become larger as the distances of the pattern areas from the lamp for a vehicle become larger whereby the intensity of the pattern area formed in the long-distance direction may be increased.

That is, according to the fourth embodiment of the present disclosure, the lens arrays may be designed separately for the division areas to implement an optical system having an optimized field of view and an optimized intensity of light. Accordingly, according to the present disclosure, the optical uniformity of the beam pattern irradiated to the road surface may be enhanced.

According to the lamp for a vehicle according to the present disclosure may enhance a uniformity of an amount of the input light in the entire area of the first lens part, and thus an uniformity of the beam pattern formed on a road surface may be enhanced by the lens array.

According to the embodiment of the present disclosure, the uniformity of the beam pattern formed on the road surface may be increased because loss of the amount of light is minimized even while an additional light source is not used.

Although the specific embodiments of the present disclosure have been described until now, the spirit and scope of the present disclosure are not limited to the specific embodiments, and may be variously corrected and modified by an ordinary person in the art, to which the present disclosure pertains, without changing the essence of the present disclosure claimed in the claims.

What is claimed is:

1. A lamp for a vehicle comprising:

a light source part configured to generate and irradiate light;

a lens array provided on a front side of the light source part, the lens array comprising:

a first lens part comprising a plurality of first micro lenses to which the light is input from the light source part; and a second lens part comprising a plurality of second micro lenses configured to output the light input from the first lens part, wherein upward/downward sizes of at least some of the plurality of first micro lenses are smaller than upward/downward sizes of the second micro lenses, the upward/downward sizes of the first micro lenses and the second micro lenses measured perpendicularly with respect to an optical axis of the light source part, wherein a central area of the lens array through which the optical axis of the light source part passes, is defined as a first area, and an area disposed at a circumference of the first area, is defined as a second area, and wherein upward/downward sizes of the first micro lenses through which the optical axis of the light source part passes are larger than upward/downward sizes of the first micro lenses provided in the second area to convert the light from the light source to a uniform light pattern projected from the lens array.

2. The lamp of claim 1, further comprising:

a shield part located between the first lens part and the second lens part and being configured to shield a portion of the light input from the first lens part to the second lens part to form a specific beam pattern on a road surface.

3. The lamp of claim 2, wherein upward/downward sizes of the first micro lenses provided in the second area are smaller than upward/downward sizes of the second micro lenses provide in the second area.

4. The lamp of claim 3, wherein upward/downward curvatures of the first micro lenses provided in the second area are larger than upward/downward curvatures of the first micro lenses provided in the first area.

5. The lamp of claim 3, wherein upward/downward sizes of the plurality of first micro lenses provided in the second area decrease as they become farther from the first area.

6. The lamp of claim 3, wherein the shield part comprises:

a plurality of unit masks provided to align with the plurality of second micro lenses, and in which masking patterns for forming the beam pattern are formed, and each of the unit masks comprises:

a shield area configured to shield the light; and a through area configured to transmit the light and having a shape of the masking pattern.

7. The lamp of claim 6, wherein when a direction that becomes farther from the lamp in the beam pattern is defined as a long-distance direction, and an opposite direction to the long-distance direction is defined as a short-distance direction, a plurality of first micro lenses disposed to align with one second micro lens are in the second area, the shield area includes a long-distance edge that contacts an end of the through area and forms an end line in the long-distance direction of the beam pattern, the end line in the long-distance direction of the beam pattern defining a border of the shield area, and a focus of a first micro lens, among the plurality of first micro lenses aligning with the one second micro lens, that forms a beam pattern in a longest-distance direction is formed at a location of the long-distance edge.

8. The lamp of claim 7, wherein in the second area, upward/downward curvatures of a first micro lens, among the plurality of first micro lenses aligned with the one second micro lens, that forms a beam pattern of the longest-distance direction are formed to be larger than upward/downward curvatures of the remaining first micro lenses.

9. The lamp of claim 8, wherein a focus of the first micro lens that forms the beam pattern of the longest-distance direction is located in the through area, and focuses of the remaining first micro lenses, other than the first micro lens that forms the beam pattern of the longest-distance direction, are located at a location that is spaced part from the through area forwards or rearwards.

10. The lamp of claim 6, wherein a size of the through area gradually increases as the plurality of unit masks becomes farther from a central portion through which an optical axis of the light source part passes.

11. The lamp of claim 10, wherein a direction that becomes farther from the lamp in the beam pattern is defined as a long-distance direction, and an opposite direction to the long-distance direction is defined as a short-distance direction, the shield area includes a long-distance edge that contacts an end of the through area and forms an end line in the long-distance direction of the beam pattern, and a short-distance edge that faces the long-distance edge and forms an end line in the short-distance direction of the beam pattern, the end line in the long-distance direction of the beam pattern and the end line in the short-distance direction of the beam pattern defining borders of the shield area, and the long-distance edge becomes gradually farther from the short-distance edge whereby a size of the through area gradually increases as the plurality of unit masks becomes farther from a central portion, through which an optical axis of the light source part passes.

12. The lamp of claim 11, wherein leftward/rightward widths of the short-distance edges formed in the plurality of unit masks are the same.

* * * * *